United States Patent
Yoon et al.

(10) Patent No.: US 10,489,015 B2
(45) Date of Patent: Nov. 26, 2019

(54) MOBILE TERMINAL AND CONTROL METHOD THEREOF

(71) Applicant: LG ELECTRONICS INC., Seoul (KR)

(72) Inventors: Sunghye Yoon, Seoul (KR); Sujin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 15/146,662

(22) Filed: May 4, 2016

(65) Prior Publication Data

US 2017/0102836 A1   Apr. 13, 2017

(30) Foreign Application Priority Data

Oct. 8, 2015   (KR) .......................... 10-2015-0141769

(51) Int. Cl.
*G06F 3/048*   (2013.01)
*G06F 3/0482*   (2013.01)
(Continued)

(52) U.S. Cl.
CPC .......... *G06F 3/0482* (2013.01); *G06F 3/0485* (2013.01); *G06F 3/0488* (2013.01);
(Continued)

(58) Field of Classification Search
CPC ........................................ G06F 3/048
See application file for complete search history.

(56) References Cited

U.S. PATENT DOCUMENTS

| | | | |
|---|---|---|---|
| 8,205,172 B2 * | 6/2012 | Wong | G06F 16/9562 715/855 |
| 8,250,491 B2 * | 8/2012 | Holmes | G06F 17/30876 702/187 |

(Continued)

FOREIGN PATENT DOCUMENTS

| | | |
|---|---|---|
| KR | 10-2008-0086196 | 9/2008 |
| WO | 03/040955 | 5/2003 |

OTHER PUBLICATIONS

PCT International Application No. PCT/KR2016/005699, Notification of Transmittal of the International Search Report and the Written Opinion of the International Searching Authority, or Declaration dated Aug. 30, 2016, 10 pages.

*Primary Examiner* — Mahelet Shiberou
(74) *Attorney, Agent, or Firm* — Lee Hong Degerman Kang & Waimey

(57) ABSTRACT

Disclosed are a mobile terminal and a control method thereof. The mobile terminal includes: a display unit configured to output a web page received from an arbitrary web server; a generation unit configured to extract one or more links included in the web page, and to generate a link tree composed of nodes having path information corresponding to the extracted links; a controller configured to select a predetermined range of nodes based on a node corresponding to the output web page, among the nodes included in the link tree, and to simultaneously capture web pages corresponding to the selected nodes with the output web page, if a preset input is detected after the web page has been output; and a storage unit configured to store images of the captured web pages in a single group. With such a configuration, a web page currently-output to the display unit may be captured to be stored simultaneously with an upper page and/or a sub page related to the currently-output web page.

23 Claims, 18 Drawing Sheets

(51) Int. Cl.
  *G06F 3/0481* (2013.01)
  *G06F 3/0484* (2013.01)
  *G06F 3/0485* (2013.01)
  *G06F 3/0488* (2013.01)
  *H04L 29/08* (2006.01)
  *H04W 88/02* (2009.01)
  *G06F 16/957* (2019.01)

(52) U.S. Cl.
  CPC ...... *G06F 3/04817* (2013.01); *G06F 3/04842* (2013.01); *G06F 16/957* (2019.01); *H04L 67/02* (2013.01); *H04W 88/02* (2013.01)

(56) References Cited

U.S. PATENT DOCUMENTS

| | | | |
|---|---|---|---|
| 2002/0194611 A1* | 12/2002 | Hodgkinson | H04N 5/44543 725/109 |
| 2006/0101330 A1 | 5/2006 | Godley | |
| 2006/0224997 A1 | 10/2006 | Wong et al. | |
| 2006/0265417 A1* | 11/2006 | Amato | G06F 17/30864 |
| 2008/0140532 A1* | 6/2008 | Johnson | G06Q 30/02 705/14.19 |
| 2008/0282196 A1* | 11/2008 | Park | H04M 1/72544 715/838 |
| 2011/0107226 A1 | 5/2011 | Heo | |
| 2011/0138295 A1* | 6/2011 | Momchilov | G06F 3/0484 715/740 |
| 2012/0010995 A1* | 1/2012 | Skirpa | G06F 3/0481 705/14.49 |
| 2015/0012811 A1* | 1/2015 | Chan | G06F 17/30873 715/234 |
| 2015/0277571 A1* | 10/2015 | Landau | G06F 3/04842 715/863 |
| 2016/0041954 A1* | 2/2016 | Bloch | G06F 3/0486 715/234 |
| 2016/0110093 A1* | 4/2016 | S | G06F 3/0883 715/863 |

* cited by examiner

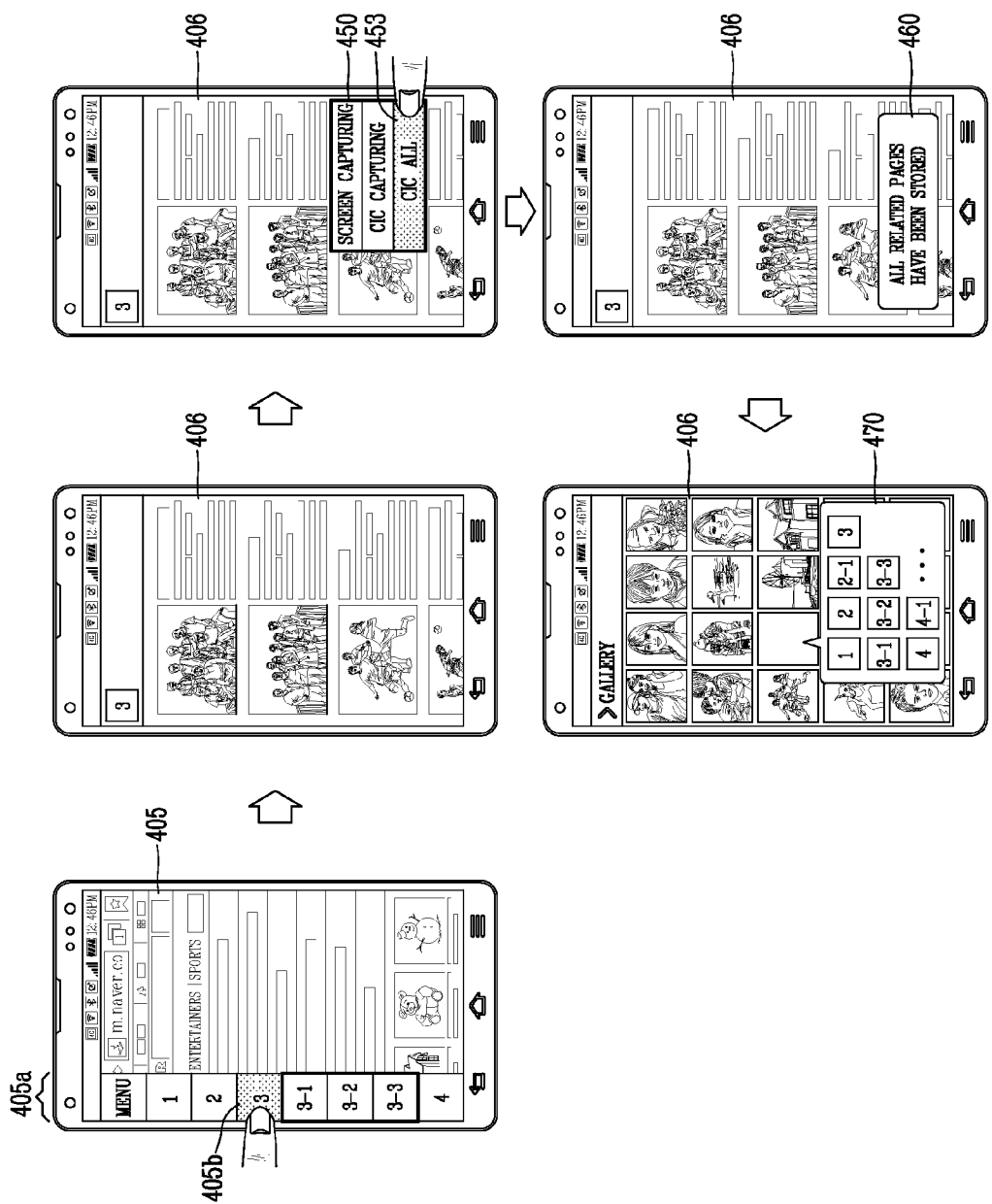

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2015-0141769, filed on Oct. 8, 2015, the contents of which are all hereby incorporated by reference herein in its entirety.

BACKGROUND OF THE INVENTION

1. Field of the Invention

The present invention relates to a mobile terminal and a control method thereof, and more particularly, to a mobile terminal capable of capturing a screen output to a display unit and a control method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

With such an improvement, the mobile terminal may capture a screen output to a display unit, and may store the captured image therein.

Screen capturing may be performed with respect to an entire region or a partial region of a screen output to the display unit. If a user wishes to store desired information while navigating desired pages on a specific web site, the user has a difficulty in executing screen capturing whenever a web page is changed.

Further, since a plurality of captured web page screens are stored based on a captured time point, if desired information is included in a plurality of pages, it is difficult to view information in order. In this case, a user should repeat the same gesture in order to view information.

SUMMARY OF THE INVENTION

Therefore, an aspect of the detailed description is to provide a mobile terminal capable of storing a plurality of related web pages at a time by a single operation, and a control method thereof.

Another aspect of the detailed description is to provide a mobile terminal capable of viewing captured web pages in hierarchical order for easy understanding, and a control method thereof.

Still another aspect of the detailed description is to provide a mobile terminal capable of informing an updated state of content corresponding to captured web pages, and a control method thereof.

To achieve these and other advantages and in accordance with the purpose of this specification, as embodied and broadly described herein, there is provided a mobile terminal, including: a display unit configured to output a web page received from an arbitrary web server; a generation unit configured to extract one or more links included in the web page, and to generate a link tree composed of nodes having path information corresponding to the extracted links; a controller configured to select a predetermined range of nodes based on a node corresponding to the output web page, among the nodes included in the link tree, and to simultaneously capture web pages corresponding to the selected nodes with the output web page, if a preset input is detected after the web page has been output; and a storage unit configured to store images of the captured web pages in a single group.

In an embodiment of the present invention, if the output web page is converted into another web page, the controller may update the link tree based on one or more links included in the another web page.

In an embodiment of the present invention, if the images of the captured web pages are stored, thumbnail images corresponding to the captured web pages may be displayed on the display unit in the form of a preview.

In an embodiment of the present invention, if the node corresponding to the output web page is a terminal node, the controller may select a predetermined range of upper nodes and a root node based on the terminal node, and may simultaneously capture upper pages corresponding to the selected nodes with the output web page.

In an embodiment of the present invention, if the node corresponding to the output web page is an intermediate node, the controller may select a predetermined range of upper and sub nodes based on the intermediate node, and may simultaneously capture upper and sub pages corresponding to the selected nodes with the output web page.

In an embodiment of the present invention, if the node corresponding to the output web page is a root node, the controller may select a predetermined range of sub nodes based on the root node, and may simultaneously capture sub pages corresponding to the selected nodes with the output web page.

In an embodiment of the present invention, web pages corresponding to the predetermined range of nodes may be restricted to web pages which have been output to the display unit.

In an embodiment of the present invention, the generation unit may control a total number of nodes included in the link tree, by controlling at least one of the number of nodes which belong to the same level in the link tree, and a depth of the link tree.

In an embodiment of the present invention, the controller may capture the output web page when a first input is sensed, and may capture web pages corresponding to all nodes included in the link tree when a second input is sensed.

In an embodiment of the present invention, the controller may output the link tree to the display unit when the preset input is sensed, and may select web pages to be captured based on a touch input applied to the output link tree.

In an embodiment of the present invention, a node corresponding to the output web page, and nodes corresponding to the selected web pages in the output link tree may display images distinguished from each other visually.

In an embodiment of the present invention, upon capturing of the web pages corresponding to the selected nodes and the output web page, the controller may display a notification icon indicating that the web pages have been captured, on the display unit, and the notification icon may display information about the captured web pages.

In an embodiment of the present invention, if a preset touch gesture is applied to the output web page, the controller may display at least one capturing region among a plurality of capturing regions included in the output web page, and may simultaneously capture a web page corresponding to the selected capturing region with the output web page.

In an embodiment of the present invention, each of the plurality of capturing regions may be provided with an image object for selection. And when a capturing region is selected based on a touch input applied to the image object, the controller may simultaneously capture a web page corresponding to the selected capturing region with the output web page.

In an embodiment of the present invention, upon output of the thumbnail images, the controller may edit the captured images based on a touch input applied to the thumbnail images.

In an embodiment of the present invention, the thumbnail images may include path information of corresponding web pages. Upon selection of one of the thumbnail images for storage of the captured images, the controller may access a web page corresponding to the selected thumbnail image, and may convert the output web page into the web page corresponding to the selected thumbnail image.

In an embodiment of the present invention, the controller may control a capturing region of the web pages to include not only a region currently-displayed on the display unit, but also a region to be displayed on the display unit as a scroll input is applied to the display unit.

In an embodiment of the present invention, a display order of the captured images may be determined based on a level of nodes corresponding to the web pages of the captured images.

In an embodiment of the present invention, if an upper page image among the captured images is displayed, an image object indicating that there is a stored sub page image, may be displayed on a corresponding region.

In an embodiment of the present invention, if a touch input is applied to the region, the controller may output a sub page image corresponding to the region, to the display unit.

In an embodiment of the present invention, each of the captured images may display an object including path information of a corresponding web page.

In an embodiment of the present invention, if one of the captured images is output to the display unit and a touch input is applied to the object of the output captured image, the controller may access a web page corresponding to the path information and output the web page to the display unit.

To achieve these and other advantages and in accordance with the purpose of this specification, as embodied and broadly described herein, there is also provided a control method of a mobile terminal, including: outputting a web page received from an arbitrary web server; extracting one or more links included in the web page, and generating a link tree composed of nodes having path information corresponding to the extracted links; selecting a predetermined range of nodes based on a node corresponding to the output web page, among the nodes included in the link tree, and simultaneously capturing web pages corresponding to the selected nodes with the output web page, if a preset input is detected; and storing images of the captured web pages in a single group.

Effects of the Present Invention

As aforementioned, in the mobile terminal and the control method thereof according to the present invention, a web page currently-output to the display unit may be captured to be stored simultaneously with an upper page and/or a sub page related to the currently-output web page. Further, a user may view captured images in navigation order or in hierarchical order of a web site. Besides, the user may easily access a corresponding web page based on a touch input applied to the captured images.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 4A to 4C are conceptual views illustrating various embodiments to select a different web page to be captured, based on an output web page, according to the present invention;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
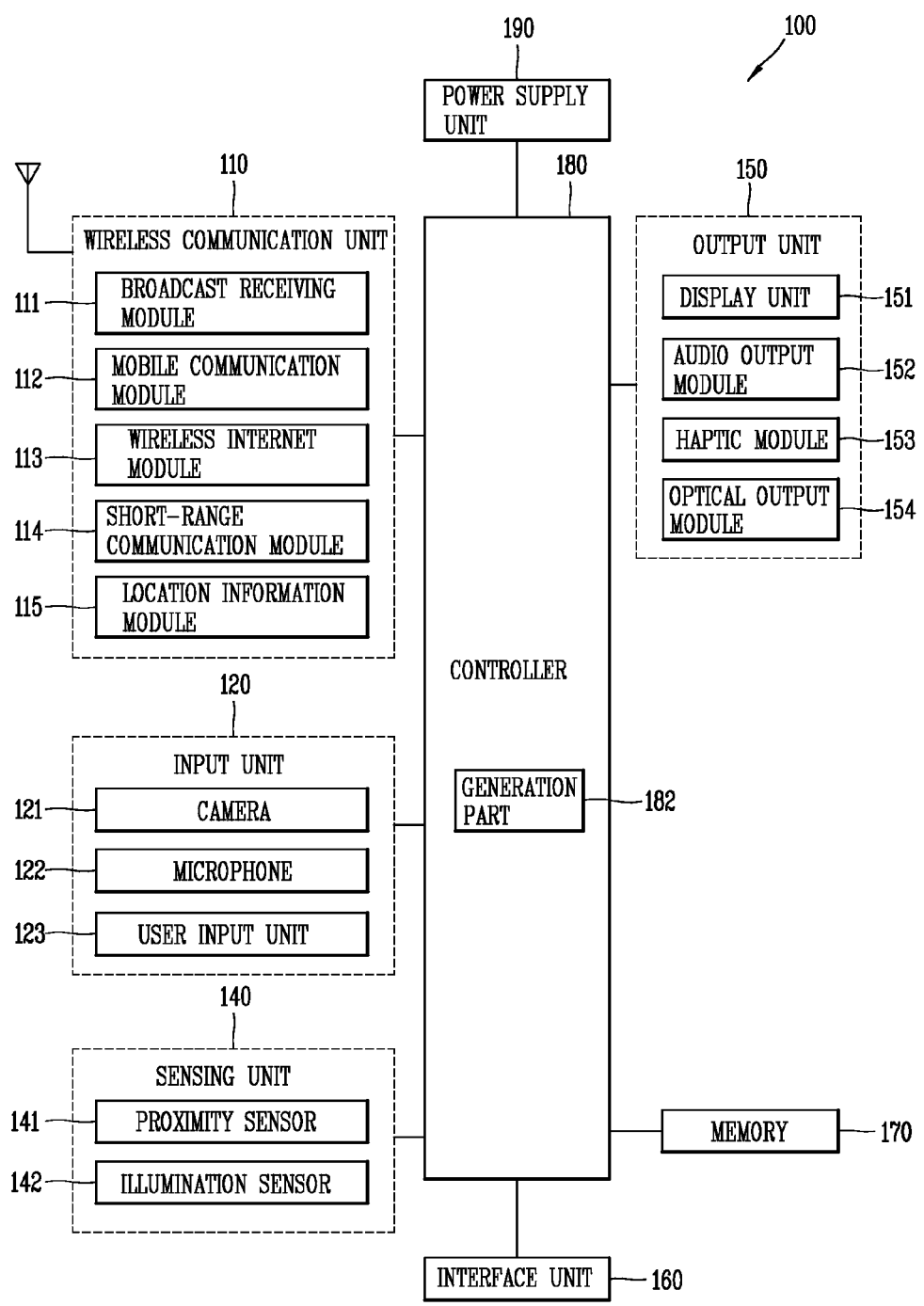
FIG. 1A is a block diagram of a mobile terminal according to an embodiment of the present invention.
Figure 1B:
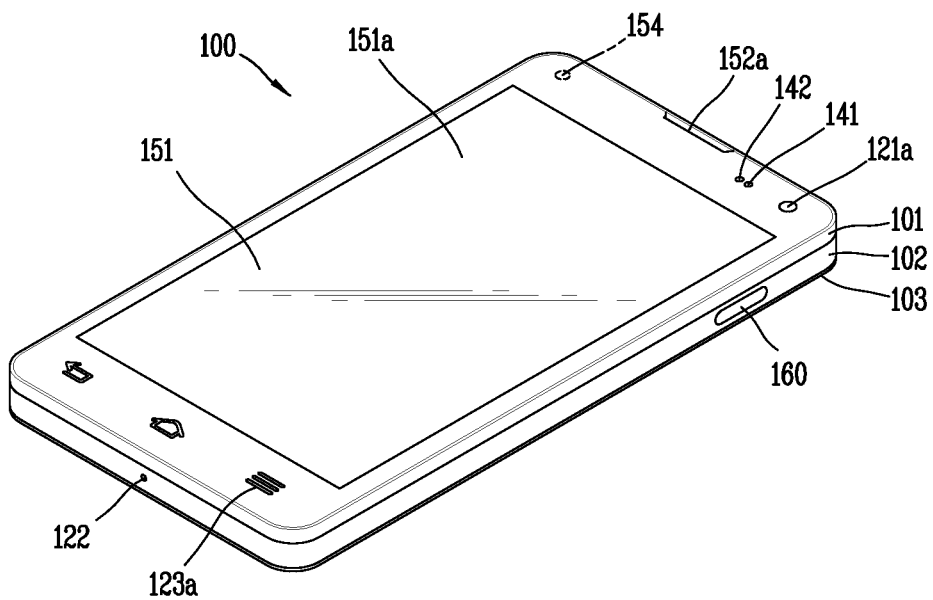
FIGS. 1B and 1C are views illustrating a mobile terminal according to the present invention, which are viewed from different directions.
Figure 1C:
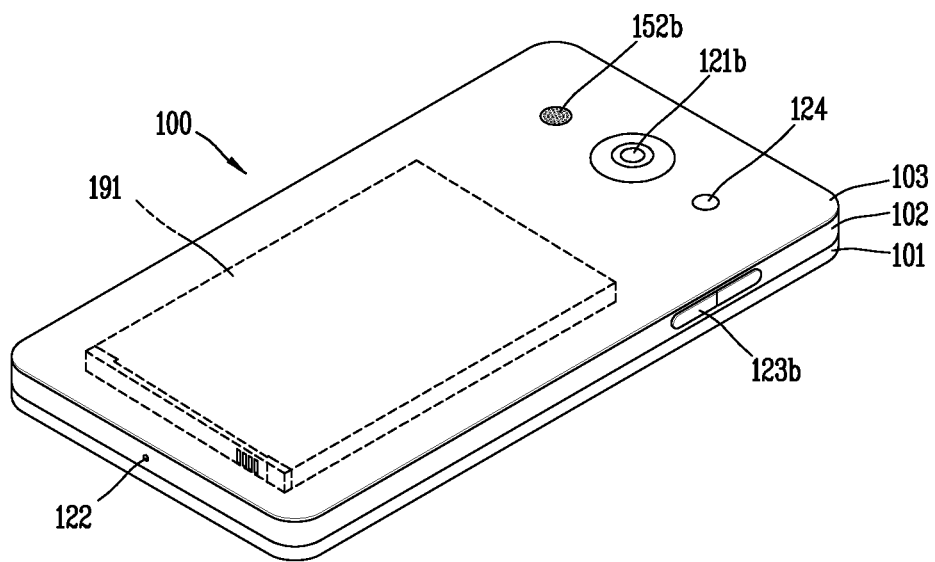

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented. Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes to one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with one another in order to implement an operation, control or control method of the mobile terminal according to various exemplary embodiments to be described below. The operation, control or control method of the mobile terminal may be implemented on the mobile terminal by the execution of at least one application program stored in the memory 170.

Hereinafter, the aforementioned components will be explained in more detail with reference to FIG. 1A, before various embodiments are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to the mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EE-PROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The controller 180 may include a generation part 182 therein, and the generation part 182 may extract one or more links included in the web page.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be to mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a receiver, and the second audio output module 152*b* may be implemented in the form of a loud speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may be implemented in a user's non-tactile manner, e.g., by a proximity touch, a hovering touch, etc.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the mobile terminal according to the present invention, a specific page received from an arbitrary web server is output to the display unit 151, as a web application installed on the mobile terminal is executed. Then, links included in the output specific page are extracted, and a link tree having path information corresponding to the extracted links as nodes is generated.

The link tree has a tree structure by gradual hierarchical classifications, i.e., by firstly setting a specific page as a root node and then by generating sub pages linked to the specific page so as to have child nodes. Alternatively, the link tree may be generated based on an HTML file name or address information (e.g., URL address) of a current page.

In this case, whenever a specific page output based on a user's input is converted into another page, the generated link tree may be continuously updated, based on web source information such as an HTML file name, a URL address, sub link information, etc. of the another page.

For this, the mobile terminal may include a link tree DB for storing information on the generated link tree, or may be connected to the link tree DB. In this case, once a web page is output to the display unit 151, link data of the web page is transmitted to the link tree DB. As new nodes are generated or the existing nodes are deleted based on the transmitted link data, the link tree may be updated.

As another example, the link tree may be generated as a specific web server provides link tree information related to web pages to the mobile terminal.

If a preset input (i.e., a control command for capturing a plurality of web pages) is input in the state where the web page has been output to the display unit 151, the mobile terminal selects a plurality of web pages to be captured, and captures the selected web pages together with the web page currently-output to the display unit 151.

For this, the mobile terminal may select a predetermined range of nodes, based on a node corresponding to the web page currently-output to the display unit 151, among the nodes included in the link tree. The predetermined range of nodes may be upper/sub pages of the current web page, or other related web pages.

Upon the selection of the nodes, the mobile terminal may capture images of web pages corresponding to the selected nodes and an image of the web page currently-output to the display unit 151, and then may store the captured images. Alternatively, the mobile terminal may store the captured images in a single group. If a user wishes to store a plurality of related web pages while executing a web surfing, the user may store the plurality of web pages at a time through a single input.

In the following descriptions, 'path information' includes not only an access path of a specific web page, but also URL (Uniform Resource Locator) information of each searched link of links included in the specific web page. Thus, the path information includes not only an access path of a specific web page, but also access paths of upper and sub pages of the specific web page.

In the specification, a link tree means a hierarchical structure having path information of web pages navigated by a user during a wireless Internet surfing (i.e., an access path of navigated pages and access paths of upper and sub pages of the navigated pages) as each node. Further, it is assumed that the 'link tree' to be explained later is continuously updated whenever a web page is moved, and a node corresponding to the same web page is deleted.

Figure 2:
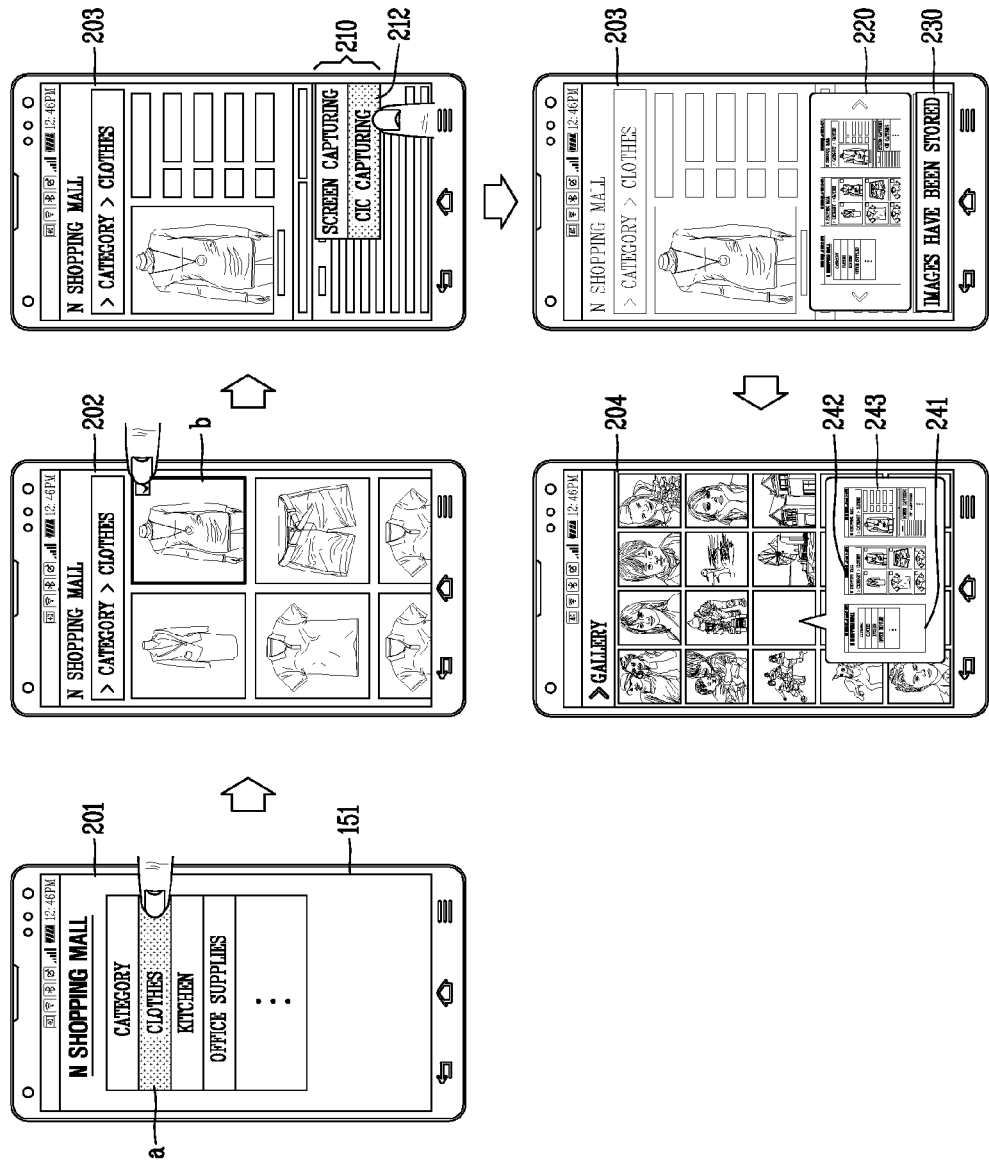
FIG. 2 illustrates conceptual views for explaining an operation implemented by the present invention.

FIG. 2 illustrates conceptual views for explaining an operation implemented by the present invention.

As shown in FIG. 2, a specific web page received from a specific web server, e.g., a home page 201 of a shopping mall may be output to the display unit 151 of the mobile terminal 100.

A generation unit 182 of the mobile terminal 100 generates a link tree having an access path of the output home page 201 as a root node, and having access paths corresponding to links included in the home page 201, as sub nodes.

Then, upon selection of a specific item from the output home page 201, a first page 202 corresponding to the selected specific item is output. If the output web page is converted into another web page, the controller 180 updates the link tree based on one or more links included in said another web page. That is, on a background of the mobile terminal 100, the generated link tree is updated based on one or more links of the first page 202.

More specifically, the controller 180 transmits, to the generation unit 182, path information and link information about the first page 202 (sub page), such that links included in the first page 202 (sub page) are extracted, and such that nodes having URL information of the extracted links are generated.

If the current page is converted into a second page 203 as a specific item included in the first page 202 is selected, the second page 203 is output to the display unit 151. And the controller 180 transmits, to the generation unit 182, path information and link information about the second page 203, thereby updating the link tree. Such generation and update of the link tree is continuously executed on a background of the mobile terminal, while a user is navigating web pages.

If a preset input (e.g., a long touch input) is applied to the second page 203 or if a push input is applied to a specific hard key (e.g., a side key of the mobile terminal), in the state where the second page 203 has been output to the display unit 151, the controller 180 may execute a capturing command including the output second page 203. For instance, referring to FIG. 2, if 'CiC capture' item is selected from a menu window 210 popped-up as a long-touch input is applied to the second page 203, capturing including the second page 203 is executed.

Upon sensing of a preset input applied to the mobile terminal, the controller 180 selects a preset range of nodes, based on a node corresponding to the second page 203 (hereinafter, will be referred to as a 'current node'), among the nodes included in the link tree generated by the generation unit 182. The preset range of nodes are set based on the current node. For instance, a plurality of upper/sub nodes may be selected through a predetermined level of zoom in/out operation based on a current node.

Upon the selection of the predetermined range of nodes, the controller 180 may simultaneously capture web pages corresponding to the selected nodes, with the output second page 203. For instance, referring to FIG. 2, as nodes of an upper level are gradually selected based on the second page 203, the web pages 201, 201 which have been output before the second page 203 may be simultaneously captured with the currently-output second page 203.

Then, thumbnail images 220 of the captured images may be output to one region of the display unit 151, in the form of a preview. If the number of the thumbnail images 220 is large, the thumbnail images 220 may be dragged or the current page may be converted into a next page, as a drag input is applied to the thumbnail images 220 right and left. A user may view captured web pages through the output thumbnail images 220.

A notification icon 230 indicating a captured state of a plurality of web pages may be popped-up on one region of the display unit 151, e.g., a lower end of the display unit 151. As a predetermined time lapses, the thumbnail images 220 and the notification icon 230 disappear from the display unit 151, and only the second page 203 remains.

The captured images may be stored in a single group, e.g., a single folder or a single directory, so as to be viewed at a time. A user may view stored images 241, 242, 243 at a time, on an executions screen 204 of an application where the captured images have been stored, e.g., a gallery application.

As aforementioned, in the present invention, a user may simultaneously capture a plurality of pages to be stored through a single input, while navigating web pages. This is effective in scrapping related pages in a group, or in comparing or sharing the related pages.

Figure 3:
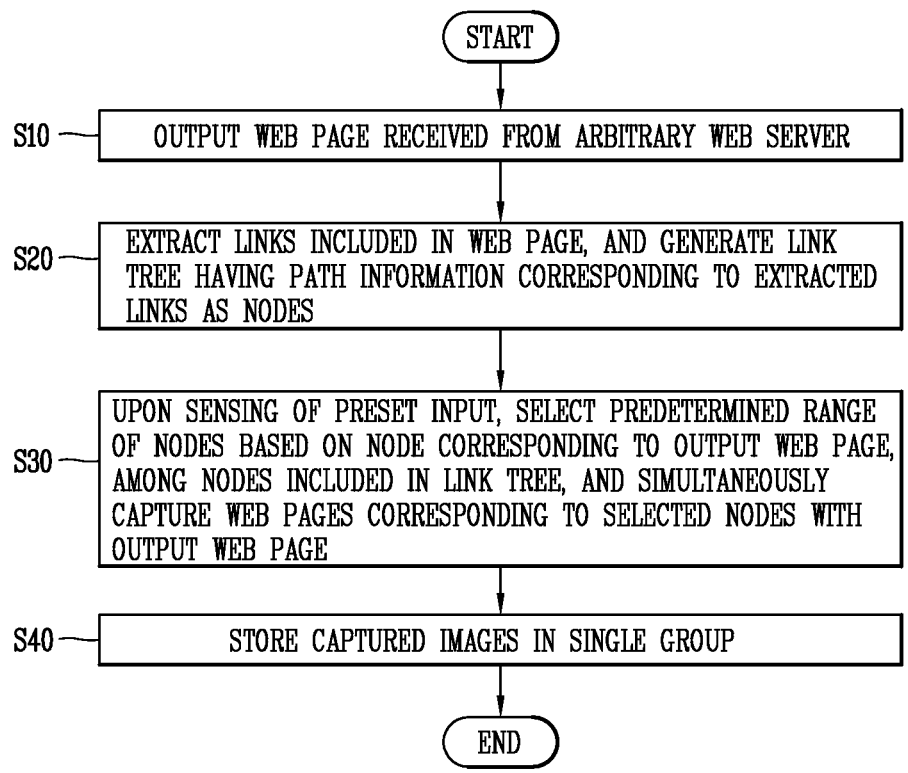
FIG. 3 is a flowchart illustrating a control method according to the present invention.

FIG. 3 is a flowchart illustrating a control method according to the present invention.

Referring to FIG. 3, a web page received from an arbitrary web serer is output to the display unit 151 (S10). For this, the wireless communication unit 110 of the mobile terminal 100 accesses a specific web server which provides a web site, and receives a web page from the specific web server. The output web page may have any type. For instance, the output web page may be a web document including texts, images, sounds, video files, etc.

Upon the output of the web page, the generation unit 182 of the mobile terminal 100 extracts links included in the output web page, and generates a link tree composed of nodes having path information corresponding to the extracted links (S20). As aforementioned, the link tree is implemented as nodes having path information (e.g., URL address) of other web pages linked to an accessed web page, include hierarchical relation information.

In this case, the links may be extracted from part not displayed on the display unit 151. That is, the links may be extracted from information to be displayed as the web page output to the display unit 151 is scrolled up and down or right and left.

More specifically, once the mobile terminal accesses a specific web page, the generation unit 182 of the mobile terminal 100 generates a link tree composed of nodes having path information of web pages from upper links to lower links of the specific web page. Further, the generation unit 182 continues to update a link tree by newly-adding a corresponding node or deleting the same node as a web page is moved. For this, whenever a specific web page is received from a specific web server, the controller 180 transmits path information and link information of the web page, to the generation unit 182.

Upon sensing of a preset input applied to the mobile terminal, the controller 180 selects a preset range of nodes, based on a node corresponding to a web page output to the display unit 151, among the nodes included in the link tree. And the controller 180 simultaneously captures web pages corresponding to the selected nodes, with the output web page (S30).

The preset input is a user input for simultaneously capturing a web page output to the display unit 151, with other web pages related to the currently-output web page. For instance, the preset input may be a long touch input applied to the output web page for a long time, a multi-touch input, a touch input applied to a specific menu region included in a popped-up window region, a push input applied to a predetermined hard key provided at a housing of the mobile terminal, etc.

A capturing region of a web page may include not only a screen output to the display unit 151, but also a region to be output as a scroll operation is input to the display unit 151. In this case, a captured image of each web page may have a different size.

The controller 180 may select a predetermined range of nodes by restricting the predetermined range of nodes based on at least one of a position or a level of a node corresponding to an output web page, and a depth of a link tree. The controller 180 may select a predetermined range of nodes by restricting the predetermined range of nodes into nodes corresponding to previously-output web pages.

Then, the controller 180 stores images of captured web pages in a single group (S40). In this case, thumbnails of the captured images may be output in the form of a preview, on a current screen. Alternatively, a notification icon indicating a captured state of web pages may include information about the number of captured web pages.

Hereinafter, various embodiments to select other web pages to be captured based on an output web page, from link nodes, will be explained in more detail with reference to FIGS. 4A to 5E.

As aforementioned, upon sensing of a preset input, the controller 180 of the mobile terminal may simultaneously capture a currently-output web page, with other pages related to the currently-output web page. The controller 180 may select, from the aforementioned link tree, nodes corresponding to other related pages, based on a node corresponding to a currently-output web page.

Figure 4A:
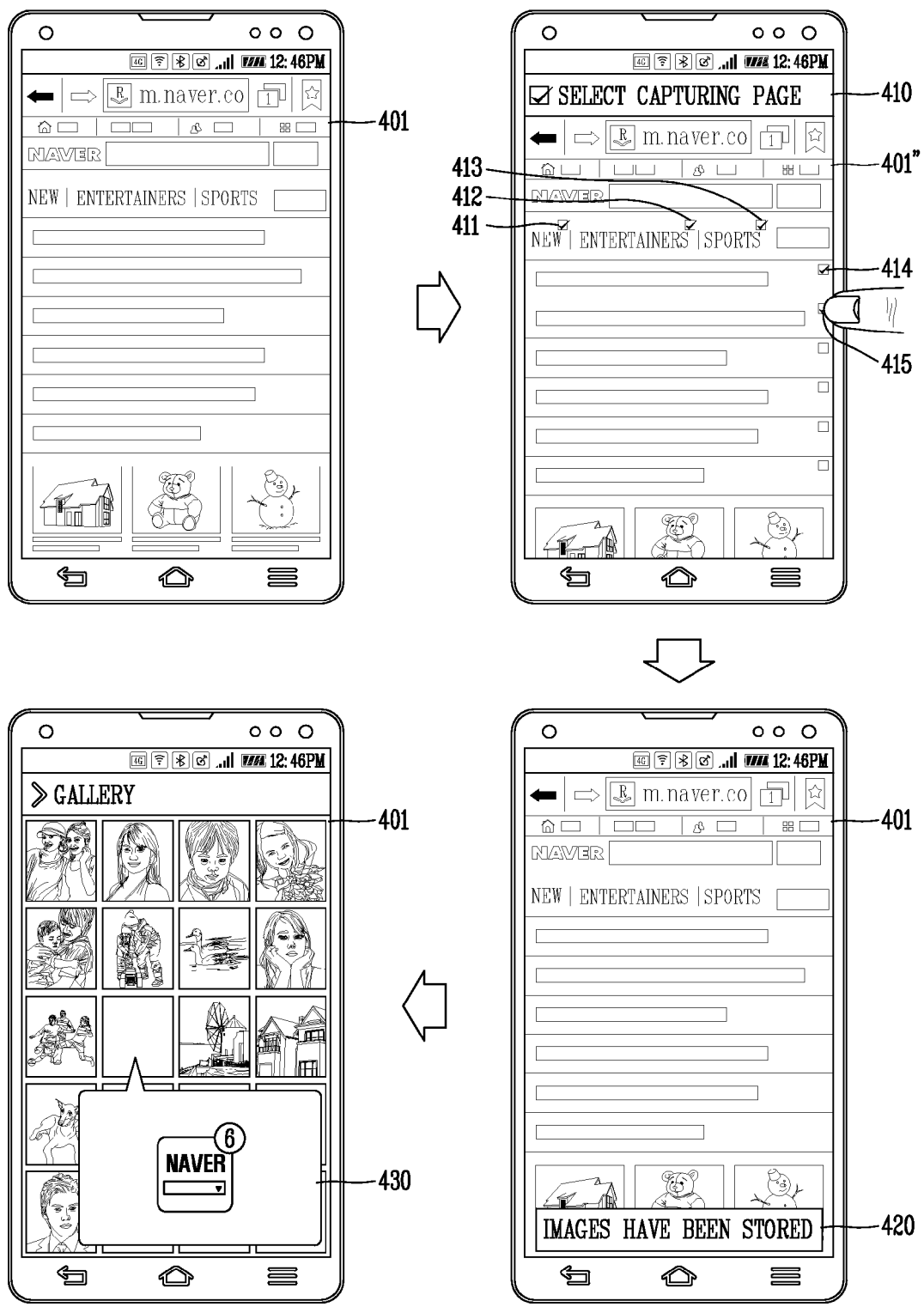
Figure 5A:
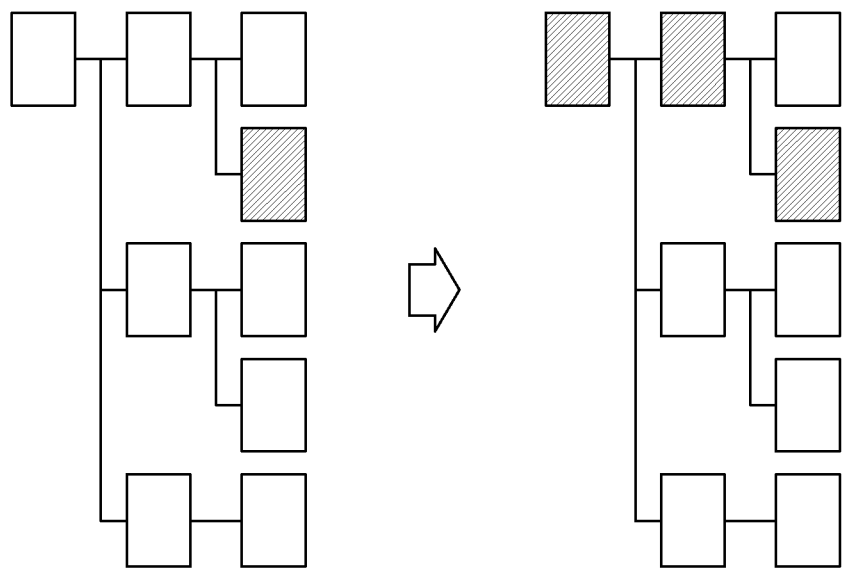
FIGS. 5A to 5E are conceptual views illustrating various embodiments to select one or more nodes of a link tree, based on an output web page, according to the present invention.
Figure 5B:
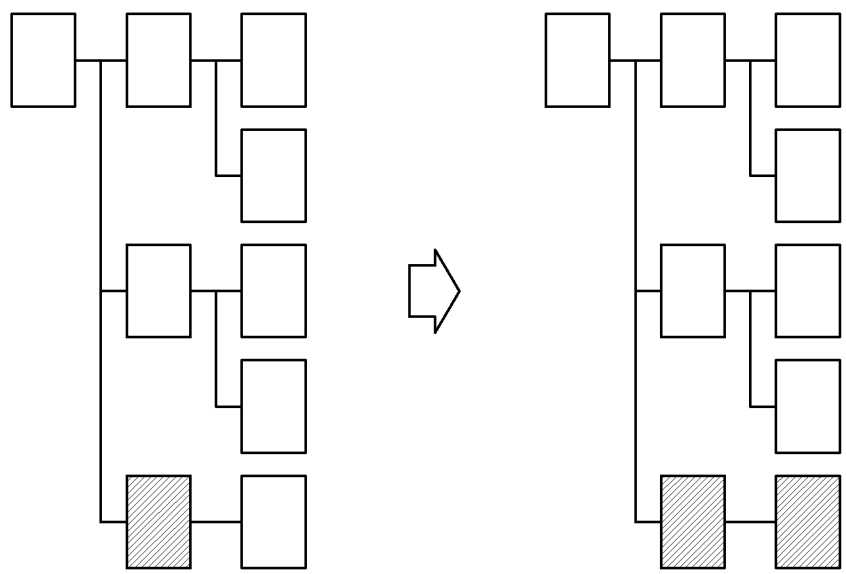
Figure 5C:
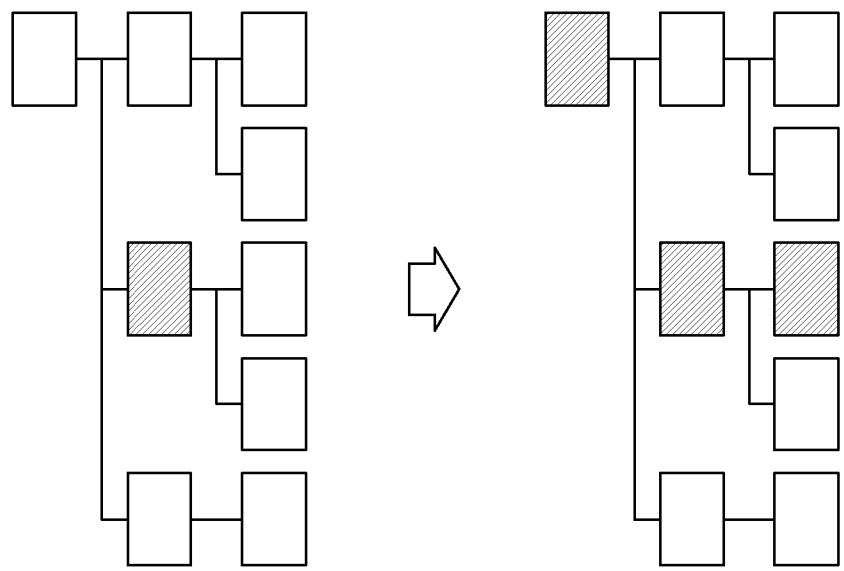
Figure 5D:
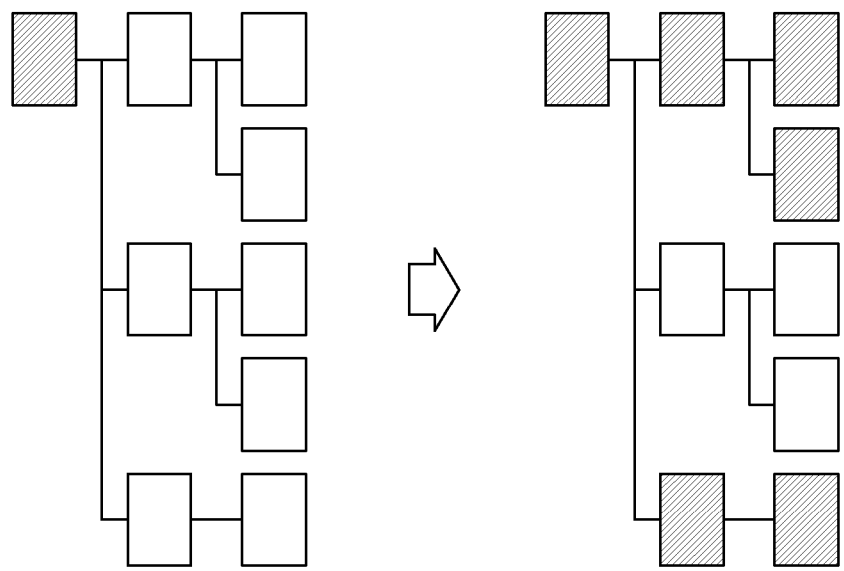

According to a first embodiment, FIGS. 4A and 5D illustrate an example to select other web pages when a node corresponding to a currently-output web page is a root node.

The root node corresponds to an uppermost node in a link tree. For instance, the root node may correspond to a start page of a web site firstly accessed as a web application is executed, or a start page of other web site. For instance, if a user has accessed other web site (e.g., 'S' shopping mall site) through a search function of a specific web portal site (e.g., 'google'), a start page of the 'S' shopping mall site may be set as a root node, or a web page where a search key word has been input on the site ('google') may be set as a root node. Alternatively, an intermediate page of a specific web site may be a root node according to a setting option on a specific domain.

If a node corresponding to a web page output to the display unit 151 is a root node, the controller 180 may select a preset range of sub nodes based on the root node, and may simultaneously capture sub pages corresponding to the selected sub nodes with the output web page. In this case, if the number of sub nodes to be selected exceeds a reference value, the controller 180 may display, on the output web page, a selection region for selecting part of sub pages linked to the output web page.

Referring to FIG. 4A, in a state where a start page 401 of a specific search site (www.naver.com) has been output to the display unit 151, if a long touch input is applied to the start page 401 for a predetermined time, a plurality of regions included in the output start page 401 are displayed in a selectable manner. For instance, objects corresponding to links included in the start page 401, i.e., texts 411, 412, 413 such as 'news', 'entertainment' and 'sport', and a plurality of images 414, 415 are displayed with image objects for selection (e.g., box images for selection). If the image objects are selected based on a touch input, corresponding regions are selected as capturing regions, and sub pages corresponding to the capturing region are about to be captured together with the start page 401.

Referring to FIG. 5D, if a node corresponding to a currently-output web page is a root node, web pages corresponding to sub nodes of the root node are captured simultaneously with web pages corresponding to upper nodes of the root node.

Referring to FIG. 4A back, the controller 180 may inform selection of a capturing region, by changing object images corresponding to links included in the start page 401. For instance, the controller 180 may display selection of a capturing region by changing a size and a color of the texts 411, 412, 413 and the images 414, 415, or by providing a highlight effect.

If content included in the selected capturing region is modified (changed, deleted or added) or updated, information on the modification may be displayed on the mobile terminal such that a user may be informed. For instance, upon the selection of the capturing region, the mobile terminal may automatically recognize information included in the capturing region. And upon reception of update information from a corresponding web server, the mobile terminal may display the received update information on the capturing region, with a function to track changed contents, etc.

Then, if an input for a capturing operation is executed (e.g., if a touch input is applied to a 'save' key displayed on a lower end of the display unit 151), sub pages corresponding to the selected regions and the start page 401 are simultaneously captured. And a notification icon 420 informing a captured state of images of a plurality of web pages is popped-up on a lower region of the display unit 151. A user may view six captured images stored in a single group 430, on an execution screen 402 of a gallery application.

Figure 4B:
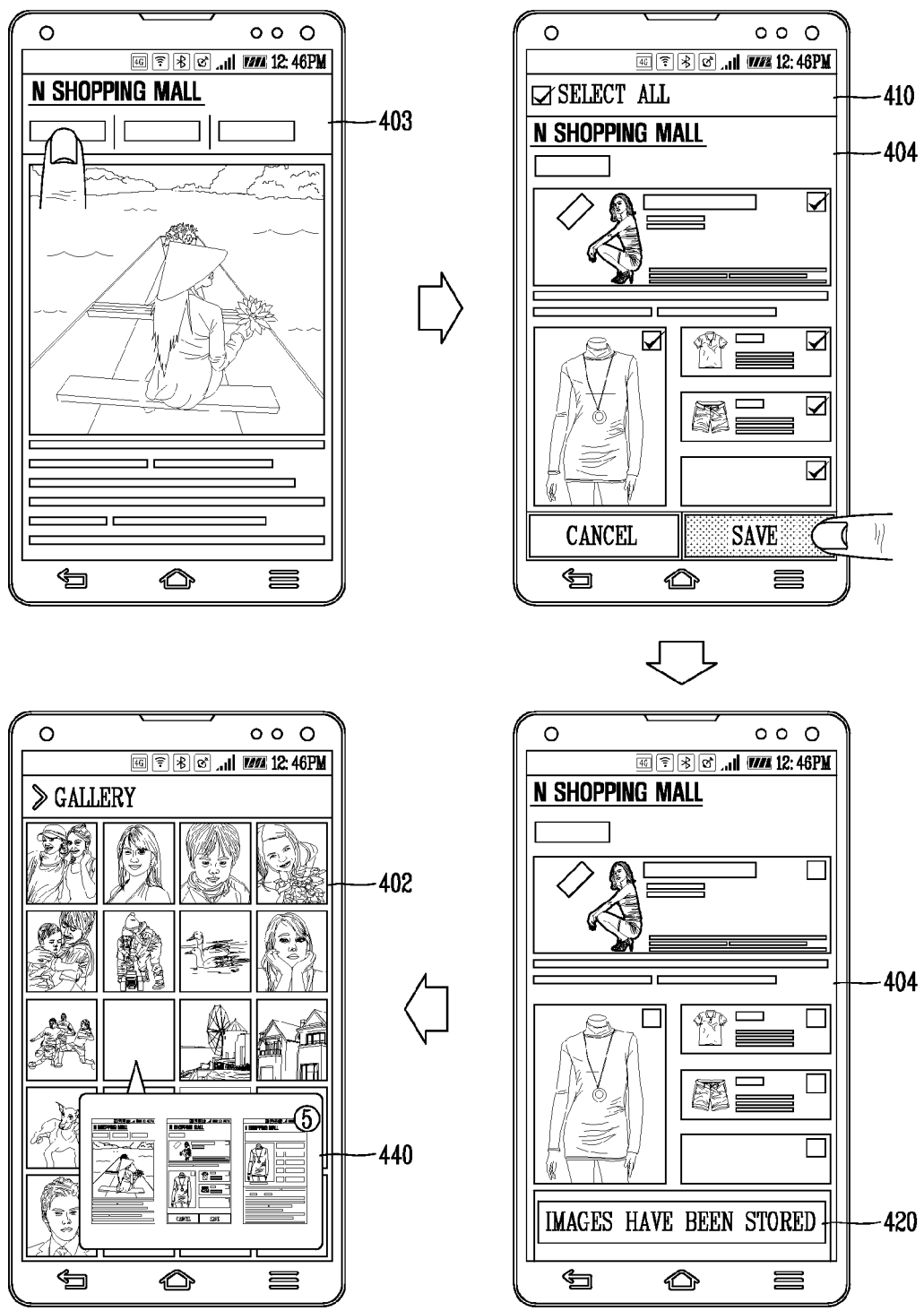

According to a second embodiment, FIGS. 4B, 5B and 5C illustrate an example to select other web pages when a node corresponding to a currently-output web page is an intermediate node. The intermediate node means an internal node rather than a root node or a terminal node in a link tree, and has one or more parent nodes and child nodes.

If a node corresponding to an output web page is an intermediate node, the controller 180 may gradually select a predetermined range of upper and sub nodes, based on the intermediate node. And the controller 180 may simultaneously capture upper and sub pages corresponding to the selected nodes, with the output web page. In this case, the node corresponding to the sub page may be selected from the currently-output web page, as aforementioned.

Referring to FIG. 4B, if a preset touch gesture is applied to the display unit 151, in a state where a start page 403 of a shopping mall site has been output to the display unit 151, and in a state the start page 403 has been converted into a next page 404 corresponding to a specific item selected from the start page 403, sub pages of the next page 404 are displayed in a selectable manner.

Upon selection of 'select all' icon displayed on an upper end of the next page 404, a plurality of regions included in the next page 404 are selected as capturing regions. As a result, the sub pages corresponding to the capturing regions, the next page 404 output to the display unit 151, and the start page 403 corresponding to an upper node of the next page 404 are simultaneously captured.

Referring to FIG. 5C, if a node corresponding to a currently-output web page is a specific node of level 2, a sub node (e.g., a child node) of the node and an upper node (e.g., a root node) of the node are selected. And web pages corresponding to the selected nodes are simultaneously captured. As another example, as shown in FIG. 5B, only a child node, except for an upper node of a node corresponding to a currently-output web page, may be selected.

Referring to FIG. 4B back, captured images are stored in a single group, and web pages corresponding to the same level of nodes in a link tree, among the captured images, may be together displayed (440).

According to a third embodiment, FIG. 5A illustrates an example to select other web pages when a node corresponding to a currently-output web page is a terminal node (leaf node). The terminal node corresponds to a node having only a parent node without a child node in a link tree.

If a node corresponding to a currently-output web page is a terminal node, the controller 180 may select a preset range of upper nodes and a root node based on the terminal node. And the controller 180 may simultaneously capture upper pages corresponding to the selected nodes, with the output web page.

Referring to FIG. 5A, if a node corresponding to a currently-output web page is a terminal node, upper nodes of the terminal node, i.e., a parent node and a root node of the terminal node are gradually selected. As aforementioned, at least part of the upper nodes may be excluded.

Figure 5E:
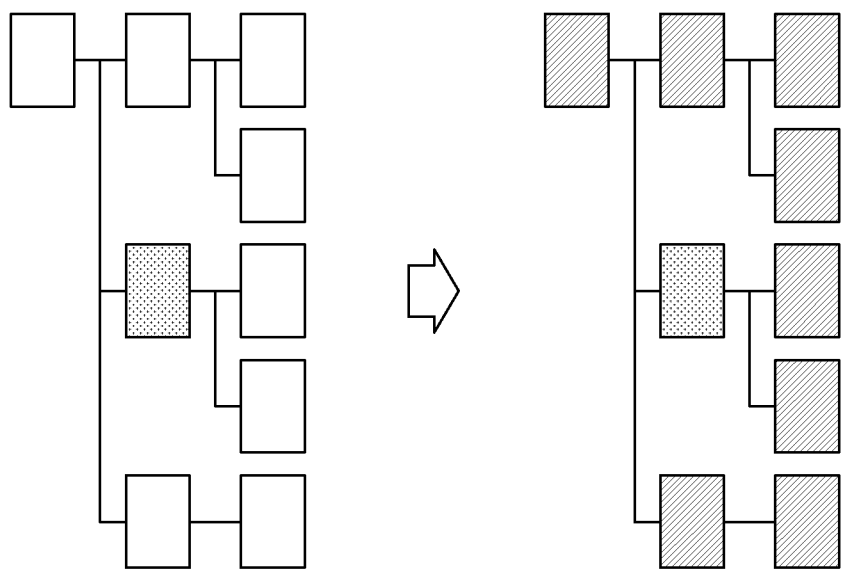

According to a fourth embodiment, FIGS. 4C and 5E illustrate an example to simultaneously capture all related web pages, regardless of a position of a node corresponding to a currently-output web page.

Referring to FIG. 4C, in a state where a web page 405 received from a specific web server has been output to a first region of the display unit 151 (e.g., a right region) and a menu region 405a related to the output web page 405 has been output to a second region of the display unit 151 (e.g., a left region), if a specific item 405b is selected from the menu region 405a, a sub page 406 corresponding to the selected item 405b is output.

In this state, upon sensing of a preset touch gesture applied onto the sub page 406, the controller 180 may simultaneously capture web pages corresponding to all nodes included in a link tree corresponding to the sub page 406.

More specifically, referring to FIG. 4C, if a long touch input is applied to the sub page 406 for more than a predetermined time, a window 450 including a plurality of menus related to a capturing operation may be popped-up.

Upon selection of 'screen capturing item' from the window 450, only the output sub page 406 is stored. Upon selection of 'CIC ALL' item from the window 450, the controller 180 recognizes that a control command for storing all web pages related to the output sub page 406 has been input. Thus, all nodes included in a link tree corresponding to the sub page 406 output to the display unit 151 are selected, and web pages corresponding to all the nodes are stored together with the sub page 406.

Referring to FIG. 4C, a control command for capturing all web pages related to the output web page is implemented in the form of a touch input applied to a specific item on the window 450. However, the present invention is not limited to this. That is, the control command may be implemented as a push input applied to a specific hard key, a touch input applied to a specific region of the display unit 151, and a preset type of touch gesture (e.g., a touch gesture having a specific pattern).

Upon capturing of all related web pages, a notification icon 460 indicating the captured state of all the related web pages is output to one region of the display unit 151, e.g., a lower region of the display unit 151. The captured web pages are stored in a single group, and a captured image 470 may include indications (e.g., 1, 2, 2-1, 3, 3-1, . . . ) for indicating hierarchical relations among the web pages.

Referring to FIG. 5E, if a node corresponding to a currently-output web page is a specific node of level 2, all nodes of a link tree are selected regardless of a level of the corresponding web page. Such a capturing operation is particularly advantageous in generating a manual related to an output web page.

The controller 180 may restrict a maximum number of images to be captured simultaneously, for efficiency of a storage space.

More specifically, the controller 180 may control only web pages which have been previously output to the display unit, to be captured when a plurality of web pages are captured. In this case, even if a 'backward' operation is repeated while a user is navigating web pages, the same page is not repeatedly captured, because the same node is removed when a link tree is updated.

The controller 180 may control a total number of nodes included in a link tree, by controlling at least one of the number of nodes which belong to the same level in the link tree, and a depth of the link tree.

For instance, if a depth of the link tree becomes great (e.g., 7) while a user is navigating web pages, the controller 180 may transmit a control command to the generation unit 182 such that a brother node of the node corresponding to the currently-output web page is deleted from the link tree. As another example, the controller 180 may control the generation unit 182 such that the depth of the link tree may be always within the range of a predetermined value (e.g., 7).

Figure 6:
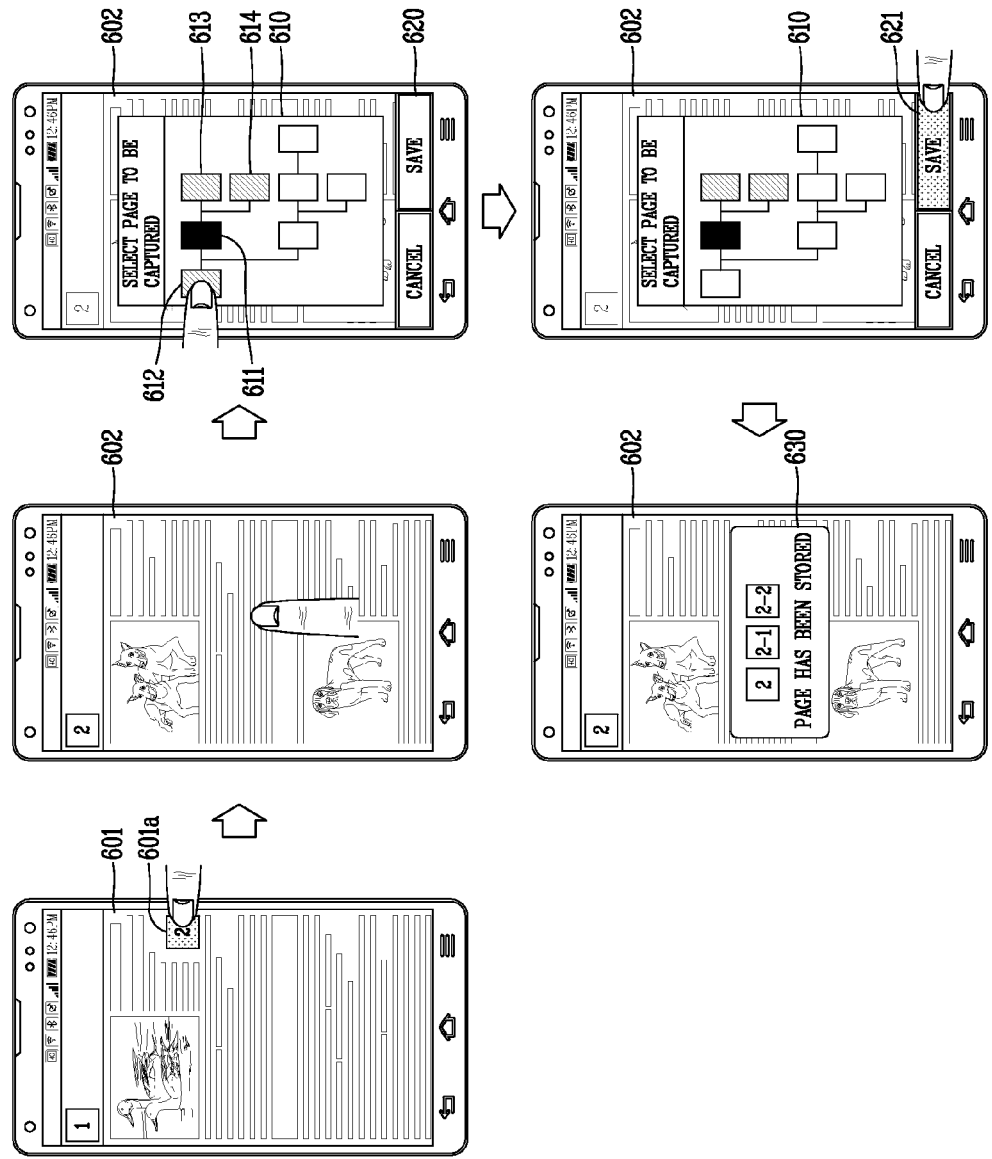
FIG. 6 is a conceptual view illustrating a method for selecting a web page to be captured, based on a displayed link tree, according to the present invention.

FIG. 6 is a conceptual view illustrating a method for displaying a generated link tree on a screen, and for selecting a web page to be captured based on the displayed link tree, according to the present invention.

Once a specific web page is output to the display unit 151, the controller 180 transmits link information about the output specific web page, to the generation unit 182, such that the aforementioned link tree is generated and updated.

As aforementioned, if a preset input is sensed on the display unit 151, the controller 180 may output a link tree updated based on a currently-output web page, to the display unit 151. The output link tree is displayed such that one or more nodes corresponding to a web page to be captured are selected.

Referring to FIG. 6, upon selection of a specific object 601a included in a first web page 601 output to the display unit 151, a second web page 602 corresponding to the selected object 601a is output. As a result, a link tree generated based on link information of the first web page 601 is updated based on link information of the second web page 602.

In the output state of the second web page 602, if a preset touch gesture (e.g., a long touch input for a predetermined time) is applied to the display unit 151, the controller 180 may output, to the display unit 151, a window 610 where the link tree has been displayed.

The window 610 displays a guidance message for selecting one or more nodes corresponding to a web page to be captured, and a hierarchical relation of the link tree. The link tree on the window 610 may display a position of a node corresponding to the output web page, and a position of a node selected by a touch input.

For instance, as shown in FIG. 6, a tree image including nodes of a quadrangular shape may be displayed on the window 610. The tree image may display a node 611 corresponding to a currently-output web page, and nodes selected based on the node 611 (e.g., an upper node 612 of the node 611 and child nodes 613, 614 of the node 611) in a differentiated manner (e.g., in different colors, in different sizes, with highlighted and non-highlighted effects, etc.).

If a touch input is applied to the upper node 612 of the tree image, whether to select the upper node or not is changed. That is, if a touch input is applied to a selected node, the selected state is changed into a released state. On the other hand, if a touch input is applied to a non-selected node, the non-selected state is changed into a selected state.

Then, upon selection of 'save' item displayed on a lower end of the display unit 151, web pages which satisfy a hierarchical structure corresponding to selected nodes are simultaneously stored. That is, web pages corresponding to node 1 (611), node 2 (612) and node 3 (613) are stored. As a result, a notification icon 630, indicating that a plurality of web pages have been stored, is popped-up to disappear on the display unit 151.

In this case, the notification icon 630 may display information related to the stored web pages. For instance, the notification icon 630 may display indications for distinguishing the stored web pages from each other (e.g., thumbnail images, texts indicating hierarchical relations), an icon of an application where the web pages have been stored, etc.

Upon capturing of a plurality of web pages, the tree image output to the display unit 151 may disappear, and the controller 180 may transmit, to the generation unit 182, a control command for initializing a link tree corresponding to the tree image.

Although not shown, the link tree displayed as a predetermined input is applied may be transformed into various images which may indicate a hierarchical relation of a plurality of web pages.

In the aforementioned embodiment, a user may directly select web pages to be captured, among web pages related to a currently-output web page.

Figure 7A:
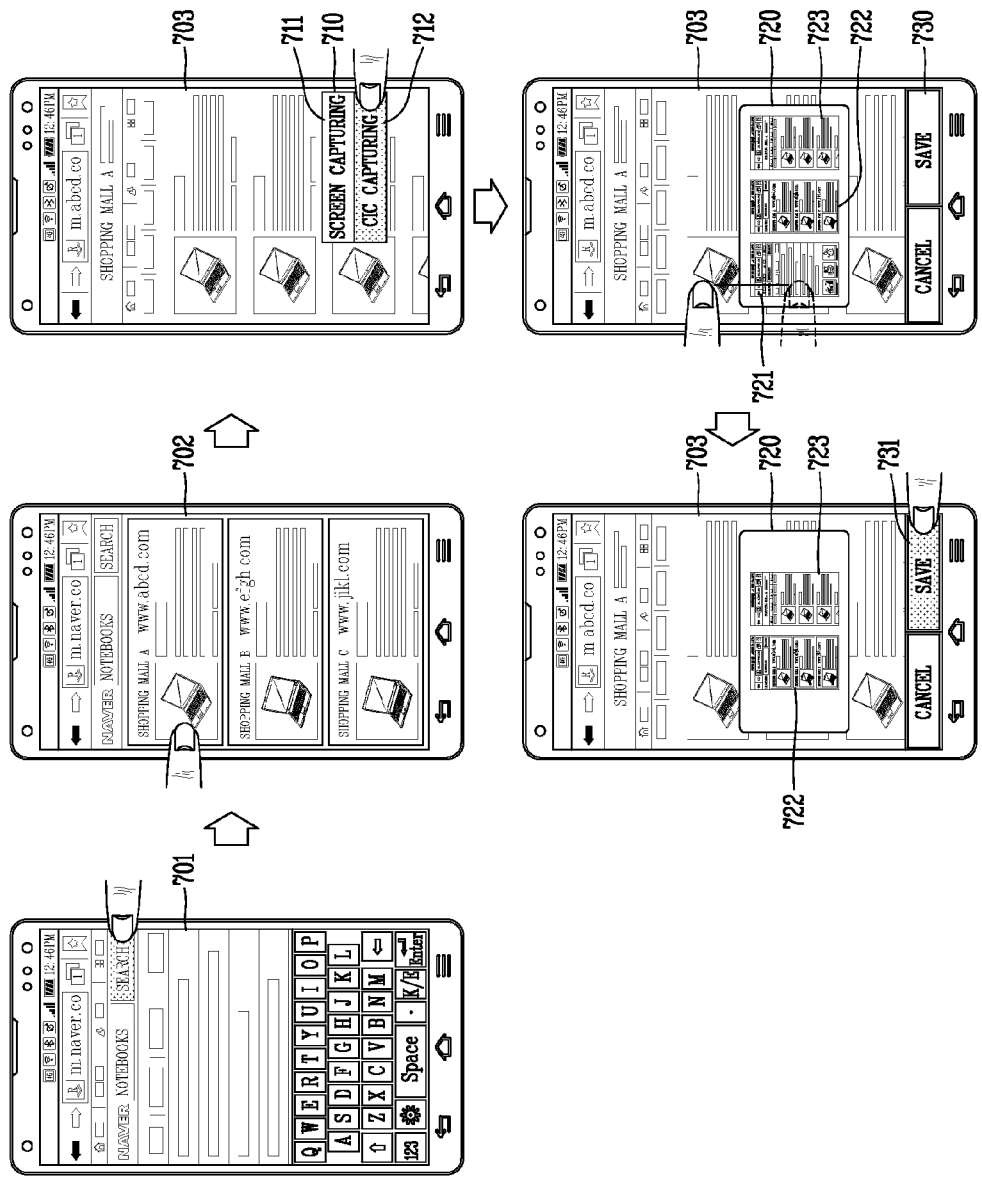
FIGS. 7A to 7C are conceptual views illustrating a method for editing captured web pages, using thumbnail images of the captured web pages, according to the present invention.
Figure 7B:
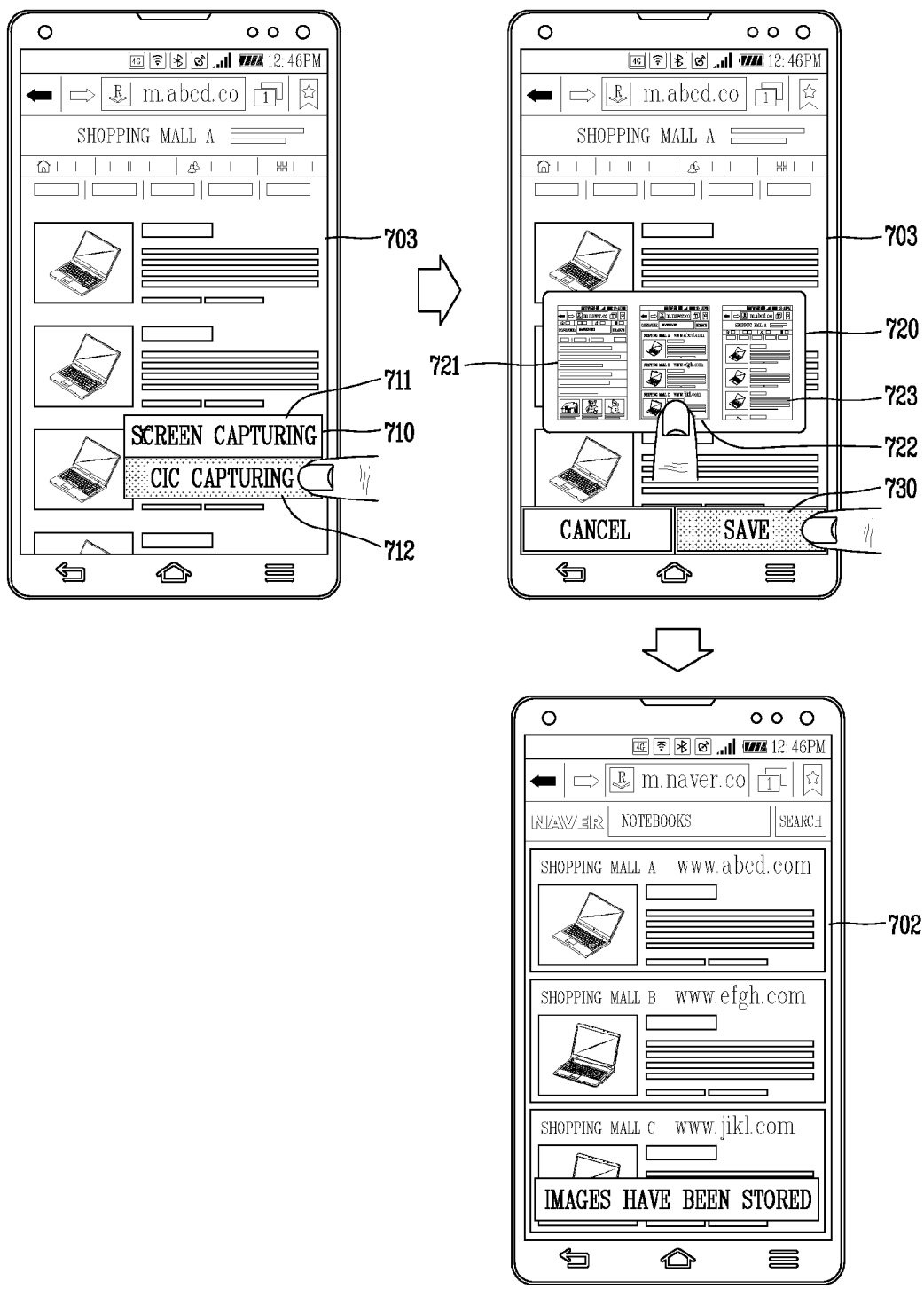
Figure 7C:
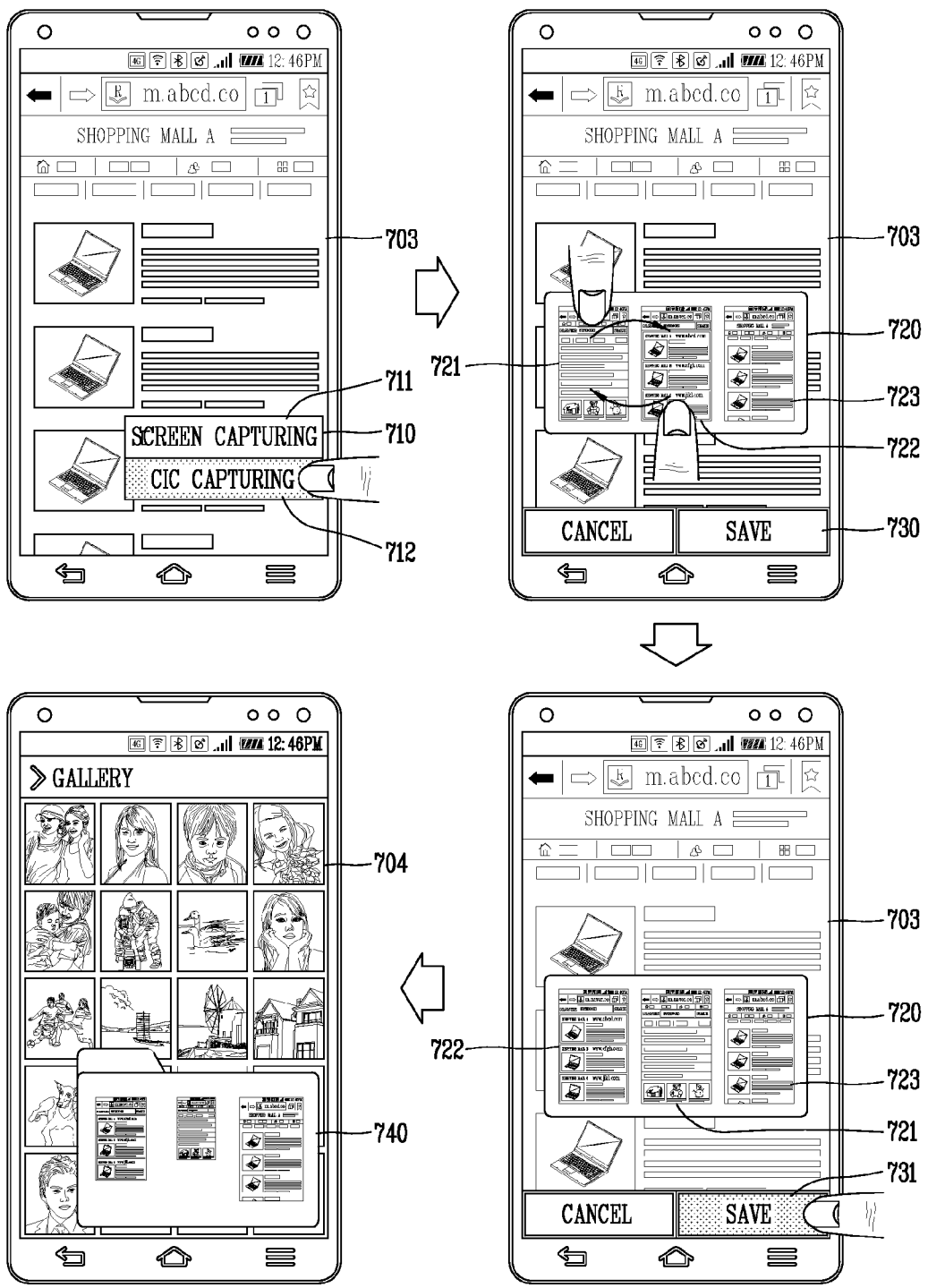

FIGS. 7A to 7C are conceptual views illustrating a method for editing captured web pages, using thumbnail images of the captured web pages, according to the present invention.

Once images of a plurality of captured web pages are stored, the controller 180 may display thumbnail images of the captured web pages on the display unit 151, in the form of a preview. A user may edit the captured web pages using the output thumbnail images, without entering an application where the captured images have been stored.

More specifically, if thumbnail images corresponding to the captured images are output by an operation for capturing a plurality of web pages, the controller 180 may edit the captured web pages based on a touch input applied to the thumbnail images.

For instance, as shown in FIG. 7A, if a key word of 'notebooks' is input to a specific search site 701, a page screen 702 corresponding to a search result is displayed. Once a specific region is selected from the displayed page screen 702, a next page screen 703 is displayed. If a long touch input is applied to the next page screen 703 for more than a predetermined time, a menu window 710 to execute an operation for capturing one or more web page screens is popped-up.

Upon selection of 'CIC capturing' item 712 from the popped-up menu window 710, the next page screen 703 is output together with an edition region 720 including thumbnail images 721, 722, 723 of the web page screens 701, 702 to be captured together with the next page screen 703.

If a drag touch input is applied to the specific thumbnail image 721 of the edition region 720 up and down, the thumbnail image 721 disappears, and a web page corresponding to the thumbnail image 721 is deleted. Then, upon touch of a 'save' key disposed on a lower end of the display unit 151, only web pages corresponding to the remaining thumbnail images 722, 723 are stored. With such a configuration, a user may finally view web pages to be captured, and may execute a deletion operation from the current screen without entering an application where the captured images have been stored.

As shown in FIG. 7B, in a state where the specific web page screen 703 and the edition region 720 have been output to the display unit 151, a touch input is applied to the specific thumbnail image 722 of the edition region 720, and then a touch input is applied to the 'save' key. In this case, the thumbnail images 721, 722, 723 included in the edition region 720 may be stored, and the web page screen 702 corresponding to the touched thumbnail image 722 may be accessed. Accordingly, the current screen 703 is converted into the accessed web page screen 702, and a notification icon indicating that the images have been stored is displayed at a lower part of the web page screen 702.

For this, each of the thumbnail images 721, 722, 723 included in the edition region 720 may include path information of a corresponding web page, i.e., URL information.

As another example of an edition operation, referring to FIG. 7C, upon execution of a switching gesture for clockwise or counterclockwise-rotating a touch input applied to the plurality of thumbnail images included in the edition region 720, the controller 180 may change a display order of the touched thumbnail images 721, 722. Then, if a touch input is applied to the 'save' key, corresponding captured web pages are stored in the display order of the thumbnail images 721, 722 (740).

Although not shown, if a pinch-in/pinch-out touch input is applied to one of the thumbnail images 721, 722, 723 included in the edition region 720, the controller 180 may store an image of a web page corresponding to the touched thumbnail image, in an enlarged/contracted manner.

If a plurality of touch inputs applied to a plurality of thumbnail images among the thumbnail images 721, 722, 723 included in the edition region 720 are dragged in a direction to become closer to each other, the controller 180 may integrate corresponding web pages as a single image.

Figure 8A:
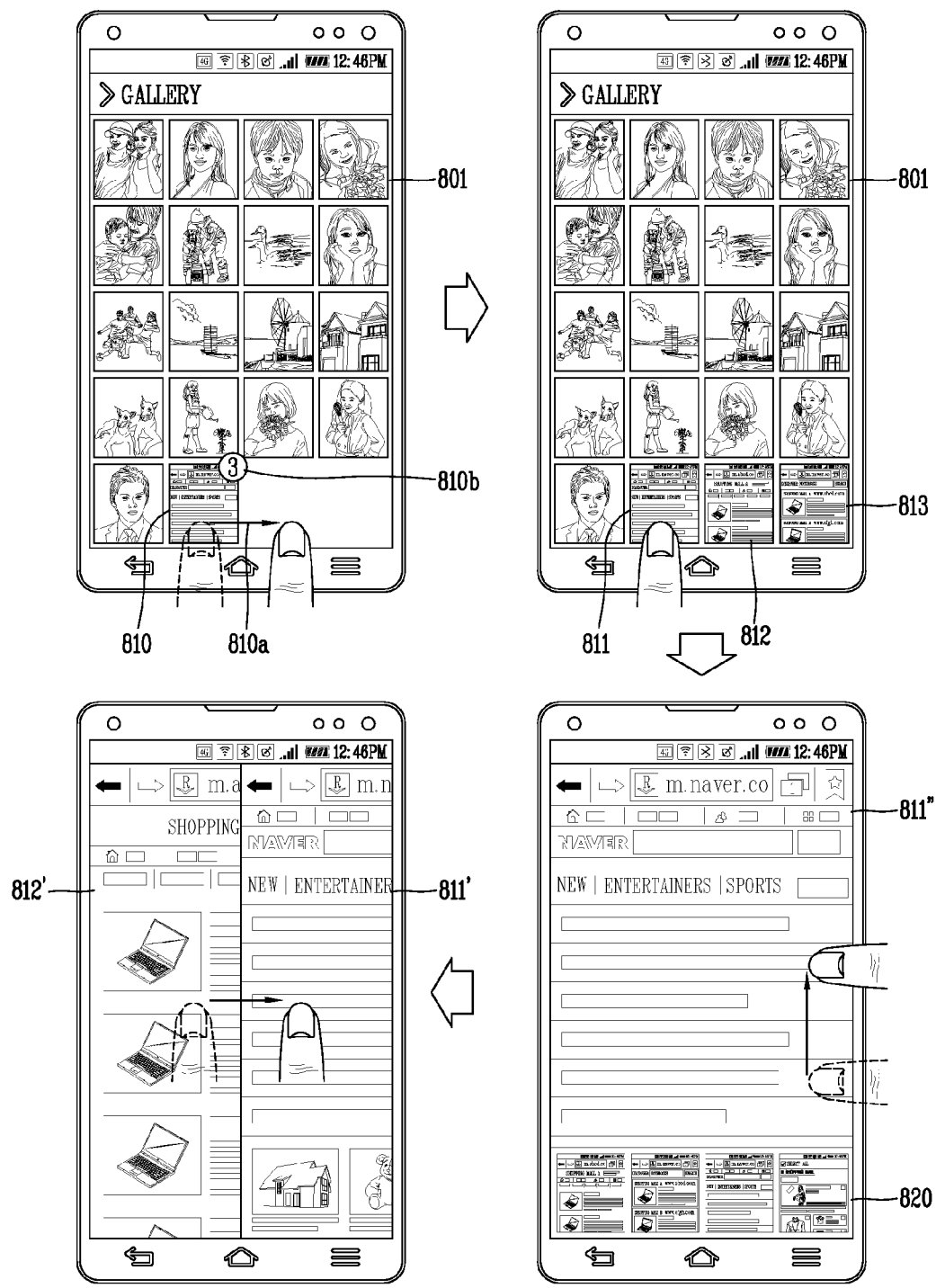
FIGS. 8A to 8C are conceptual views illustrating a method for viewing captured web pages according to the present invention.
Figure 8B:
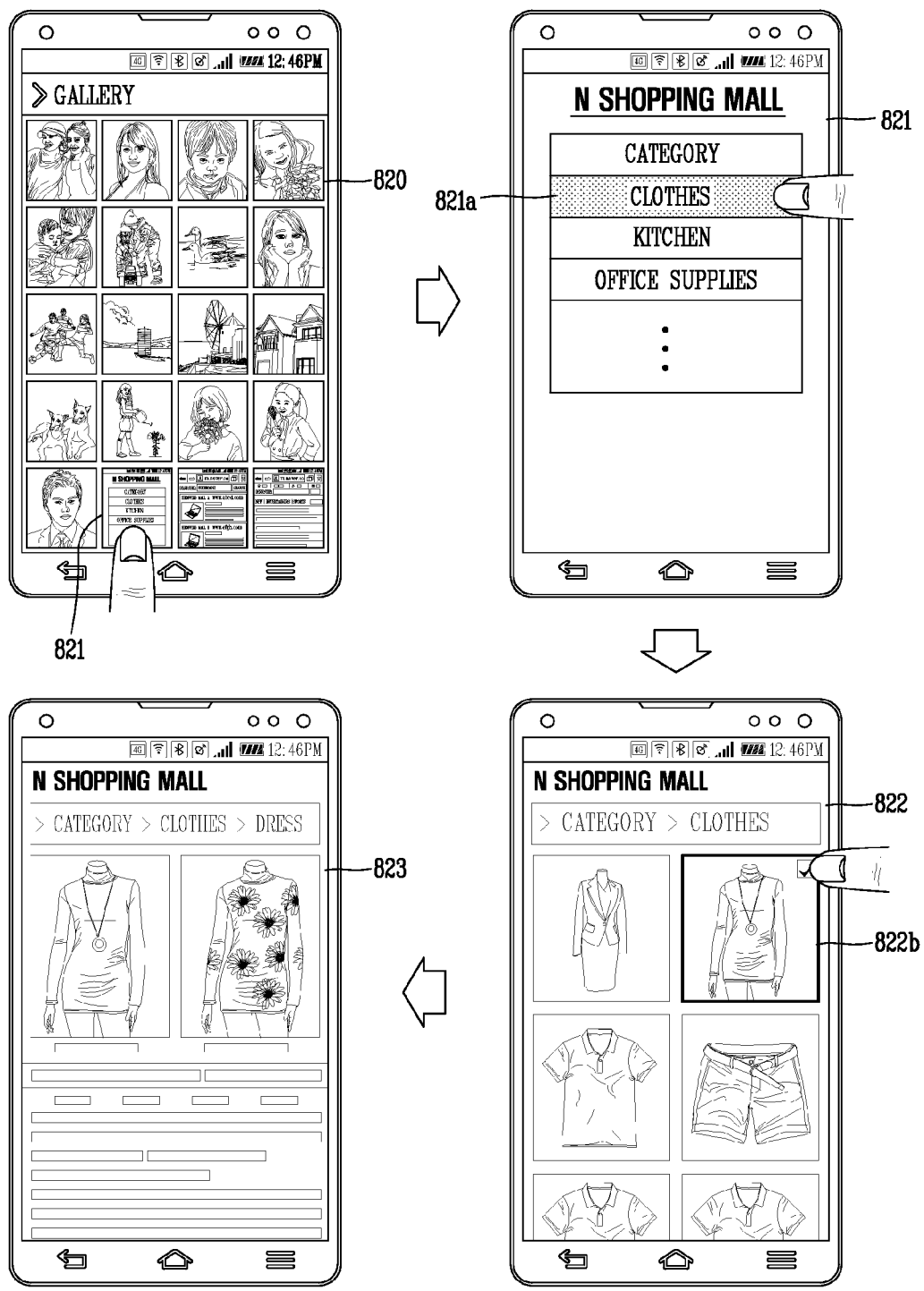
Figure 8C:
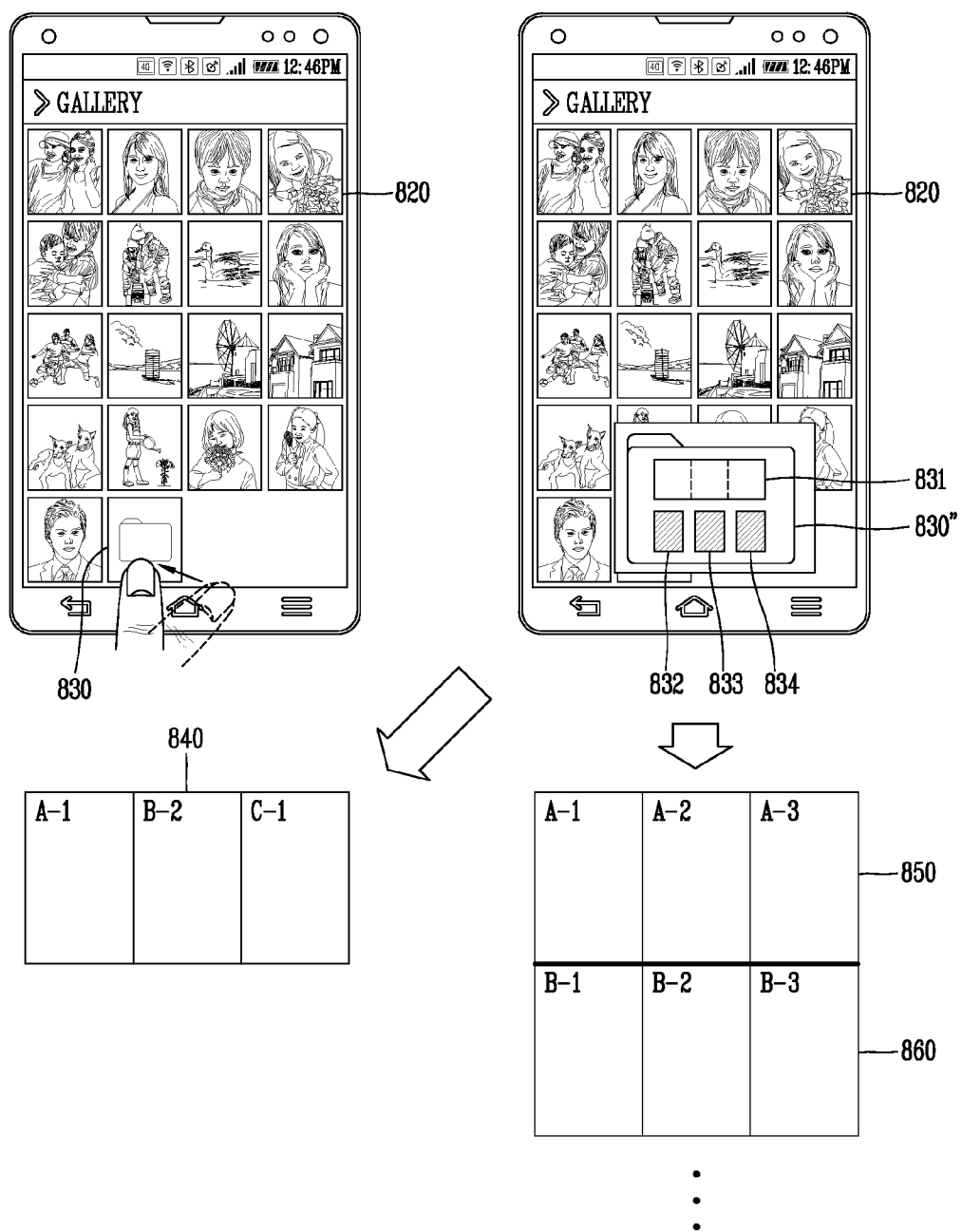

FIGS. 8A to 8C are conceptual views illustrating a method for viewing captured web pages according to the present invention If a currently-output web page and a plurality of web pages related to the currently-output web page are simultaneously captured by a preset input, images of the captured web pages are stored in a predetermined region in a single group. In this case, a capturing region of the web pages may include not only a region currently-displayed on the display unit 151, but also a region to be displayed on the display unit 151 as a scroll input is applied to the display unit 151.

The controller 180 may determine a display order of captured images, based on a level of nodes corresponding to web pages of the captured images. For instance, as aforementioned in the above examples, if a web page currently-output to the display unit 151 is captured together with web pages corresponding to upper nodes, the currently-output web page is displayed lastly in a corresponding group. On the other hand, if a web page currently-output to the display unit 151 is a web page of a highest level, the currently-output web page is displayed firstly in a corresponding group.

Referring to FIG. 8A, a plurality of captured images may be displayed on an execution screen 801 of a gallery application, as a single group image 810. The group image 810 may have an image corresponding to a web page of a high level as a representative image, and may display information 810b about the number of stored images.

If a drag input is applied to the group image 810 right and left, a plurality of images 811, 812, 813 corresponding to the group image 810 are unfolded along the drag path. If a touch input is applied to the specific image 811, a captured web page screen 811" corresponding to the touched image is output to an entire surface of the display unit 151. The captured web page screen 811" can be scrolled up and down according to a captured length. In this case, a scroll key may be displayed together. If a drag input is applied to the web page screen 811" right and left, a captured next web page screen 812" or previously-stored images may be viewed.

As shown in FIG. 8B, if an upper page image 821 is selected among stored web page images to thus be output to an entire surface of the display unit 151, an image object indicating that there exists a stored sub page image may be displayed on a corresponding region 821*a* of the output upper page image 821.

The region corresponding to the stored sub page image means a region selected to convert the output upper page image 821 into a next page. For instance, referring to FIG. 8B, if a displayed web page is captured together when a clothes item 821*a* is selected, the clothes item 821*a* corresponds to the region.

The image object indicating that there is a stored sub page image means a notification indicating that there exists a web page which belongs to a lower level than a web page corresponding to a currently-output image. For instance, the image object may be an indication displayed in the clothes item 821*a* (e.g., a shading effect on the clothes item 821*a*).

In this state, if a single touch input is applied to the clothes item 821*a*, the controller 180 may output a sub page image 822 corresponding to the clothes item 821*a*, to the display unit 151. Similarly, an indication may be displayed on a region 822*b* of the output sub page image 822, the region 822*b* for moving to a next sub page. As a touch input is applied to the region 822*b*, a next sub page image 823 may be output.

Through such an approaching method, a user may view a plurality of stored web pages in hierarchical order, thereby viewing his or her desired information as if the user navigates web pages.

The embodiment to view stored web page images in hierarchical order may be similarly applied to a case to approach an upper page image from a sub page image. For instance, a 'Q' image icon or a 'backward' image icon may be displayed as an image object for approaching to an upper page image. If a touch input is applied to the icon, an upper page image may be output gradually.

As another example, referring to FIG. 8C, if a plurality of captured images are stored in a single group, a specific image (e.g., a folder image 830) may be displayed on the execution screen 801 of the gallery application. If a touch input or a proximity touch is applied to the folder image 830, the folder image 830 is enlarged to have a predetermined size. The enlarged folder image 830" displays a thumbnail of the plurality of captured images. In this case, the enlarged folder image 830" may display a plurality of thumbnails.

For instance, the enlarged folder image 830" may display a thumbnail 831 corresponding to a first viewing mode, at an upper region. And the enlarged folder image 830" may display thumbnails 832, 833, 834 corresponding to a second viewing mode, at a lower region. The first viewing mode may be a mode to display captured web pages as if a user navigates web pages on a web application, and the second viewing mode may be a mode to display captured web pages in storage order.

Upon selection of the thumbnail 831 from the enlarged folder image 830", a web page image corresponding to an uppermost node among stored images is output to an entire region or a partial region of the display unit 151. If a specific region is selected from the output web page image, the output web page image is converted into a sub page image corresponding to the selected region. This may allow a user to view captured images as if the user navigates a web application. In the case where the web page image is output to the entire region of the display unit 151, if the output web page image is dragged right and left, an image of a web page having other path information (e.g., an image of a web page corresponding to a brother node in a link tree) may be displayed.

As another example, upon selection of one of the thumbnails 832, 833, 834 of the enlarged folder image 830", stored web page images may be output in stored order, or from a web page image corresponding to the selected thumbnail. If a drag input is applied to the output specific web page image right and left, or if a predetermined time lapses, the current specific web page image may be converted into a next/previous web page image.

Figure 9:
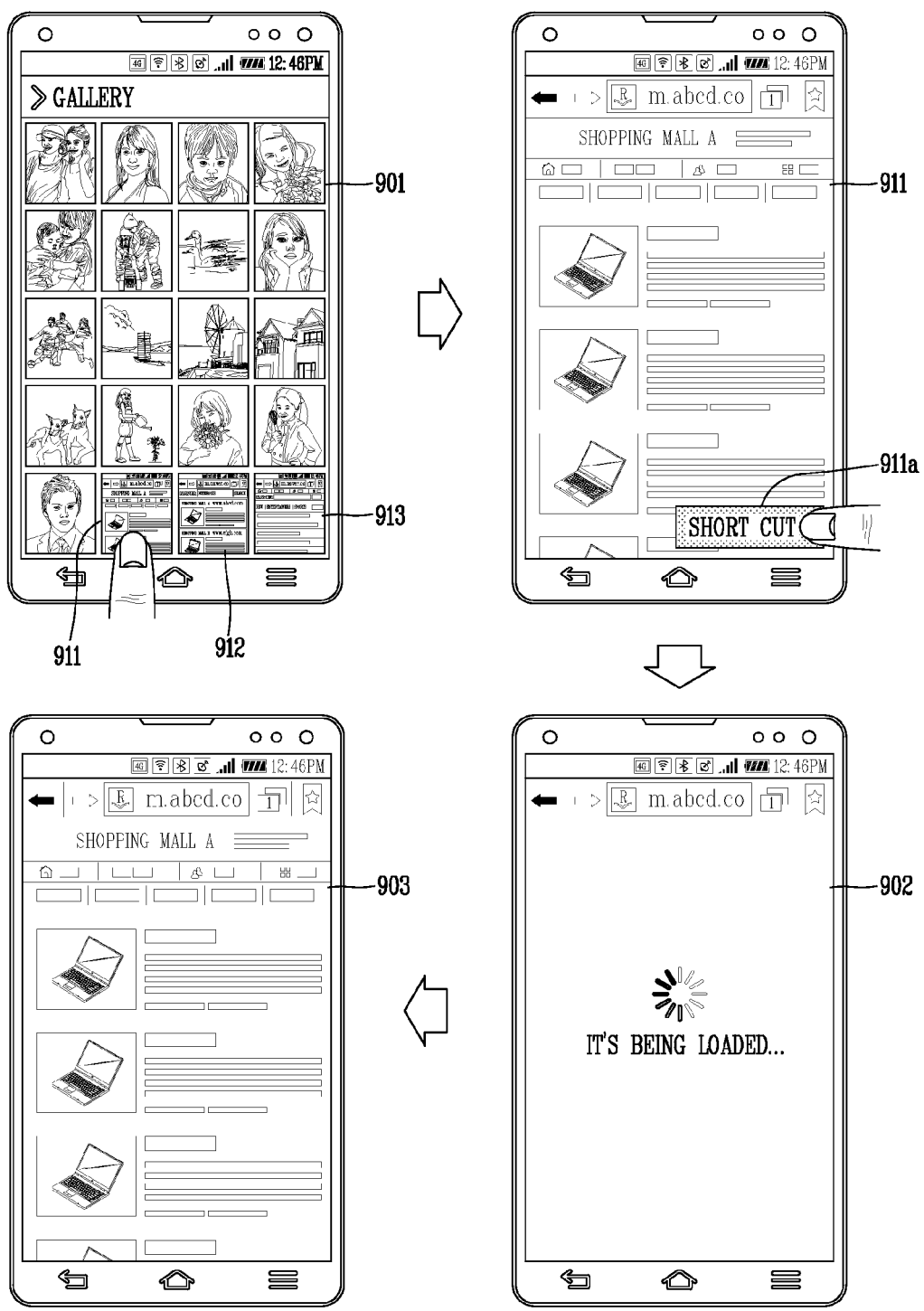
FIG. 9 is a conceptual view illustrating a method for accessing a corresponding web page, based on a touch input applied to a captured image, according to the present invention.

FIG. 9 is a conceptual view illustrating a method for accessing a corresponding web page, based on a touch input applied to captured images, according to the present invention.

Each of captured images may display an object including path information of a corresponding web page. If one of the captured images is output to the display unit 151 and a touch input is applied to the object of the output captured image, the controller 180 may access a web page corresponding to the path information and output the web page to the display unit 151.

Referring to FIG. 9, upon selection of one 911 among stored web page images on an execution screen 901 of a gallery application, the selected image 911 is output to an entire surface of the display unit 151. A shortcut button 911*a* for access to a corresponding web page may be generated on a lower end of the output image 911. If a touch input is applied to the shortcut button 911*a*, a web application is executed (902), and a web page screen 903 having path information included in the shortcut button 911*a* is output to the display unit 151.

Although not shown, if a plurality of web pages are re-captured on the output web page screen 903, images of newly-captured web pages rather than the same web page(s) as the previously-captured web pages may be added to a pre-stored group.

If a plurality of web pages are captured at a time, the controller 180 may execute an operation for sharing the plurality of captured web pages, based on an additional input.

Then, if content is updated (changed, added, deleted or the like) on a web site corresponding to the captured web pages, the controller 180 may receive update information (e.g., price change, sold-out information, etc.). And the controller 180 may display the update information on images of the captured web pages, or may inform the update information in the form of an additional message.

As aforementioned, in the mobile terminal and the control method thereof according to the present invention, a web page currently-output to the display unit may be captured to be stored simultaneously with an upper page and/or a sub page related to the currently-output web page. Further, a user may view captured images in navigation order or in hierarchical order of a web site. Besides, the user may easily access a corresponding web page based on a touch input applied to the captured images.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a memory;
   a display; and
   a controller configured to:
   cause the display to display web pages received from a web server;
   capture each of the web pages after the displaying of the web pages;
   store, in the memory, a plurality of images of the captured web pages, wherein the plurality of captured images are stored as a single group;
   cause the display to display a folder image on an execution screen of a gallery application;
   cause the folder image to be enlarged to have a predetermined size when a touch input is applied to the folder image, wherein the enlarged folder image displays a thumbnail of each of the plurality of captured images,
   wherein the enlarged folder image is displayed to further include a thumbnail corresponding to a first viewing mode, at an upper region, and to include thumbnails corresponding to a second viewing mode, at a lower region,
   wherein the first viewing mode is a mode to display captured web pages as web pages on a web application, and the second viewing mode is a mode to display captured web pages in storage order;
   cause the display to display a first image of the images of the captured web pages upon selection of one among the stored plurality of images on the execution screen of the gallery application;
   cause the display to display a shortcut button on a lower end of the displayed first image overlapping a portion of the captured web page of the first image; and
   execute a specific application on the mobile terminal to access and display a web site that is associated with the captured web page of the first image, in response to an input received with regard to the displayed shortcut button, wherein the application causes access to the web site, and
   receive update information and cause the display to display the update information on the images of the captured web pages, if content is updated on the web site corresponding to the captured web pages, and
   wherein neither the images of the captured web pages nor thumbnail preview images are updated when the update information is displayed, and
   when a plurality of web pages is recaptured, only images of newly-captured web pages of the recaptured web pages are added to the stored single group.

2. The mobile terminal of claim 1, wherein the controller is further configured to:
   cause the display to display a notification icon indicating that the web pages have been captured upon the capturing of the web pages, wherein the notification icon displays information about the captured web pages.

3. The mobile terminal of claim 1, wherein the controller is further configured to:
   cause the display to display at least one capturing region among a plurality of capturing regions included in one of the displayed web pages, and capture a web page corresponding to a selected capturing region, when a preset touch gesture is received at the displayed web page, and
   wherein each of the plurality of capturing regions is provided with an image object for selection, and wherein the controller is further configured to:
   capture the web page corresponding to the selected capturing region when the preset touch gesture is received at a respective image object among the plurality of image objects.

4. The mobile terminal of claim 3, wherein the update information includes price change and sold-out information, and
   wherein if the price change or the sold-out information is updated on the web site, the controller is configured to cause the display to display the price change or the sold-out information on the images of the captured web pages which are not updated.

5. The mobile terminal of claim 1, wherein the controller is further configured to:
   cause the display to display the thumbnail preview images respectively associated with one of the stored images of the captured web pages; and
   edit the images of the captured web pages based on a touch input received at the thumbnail images.

6. The mobile terminal of claim 5, wherein the thumbnail images include path information of corresponding web pages, and wherein the controller is further configured to:
   access a web page corresponding to a selected thumbnail image and convert the displayed web page into the web page corresponding to the selected thumbnail image, upon selection of the selected thumbnail image.

7. The mobile terminal of claim 1, wherein the controller is further configured to:
   control a capturing region of the web pages to include a region currently-displayed on the display and a region which is not currently displayed but is to be displayed on the display, in response to a scroll input applied to the display.

8. The mobile terminal of claim 1, wherein a display order of the images of the captured web pages is determined based on a level of nodes corresponding to the captured web pages.

9. The mobile terminal of claim 8, wherein if an upper page image among the images of the captured web pages is displayed, an image object indicating that there is a stored sub page image is displayed on a corresponding region.

10. The mobile terminal of claim 9, wherein the controller is further configured to:
    cause the display to display a sub page image corresponding to the region when a touch input is applied to the region.

11. The mobile terminal of claim 8, wherein the images of the captured web pages display an object including path information of a corresponding web page.

12. The mobile terminal of claim 11, wherein the controller is further configured to:
access a web page corresponding to the path information and display the web page when one of the images of the captured web pages is displayed and a touch input is received at the object of the displayed captured image.

13. The mobile terminal of claim 1, wherein the controller is further configured to:
extract a plurality of links included in one of the web pages;
generate a link tree comprising nodes each having path information corresponding to one the plurality of extracted links;
select a range of nodes, among the nodes included in the link tree, based on a node corresponding to the displayed web page; and
capture the web pages when a first input is received after the web page has been displayed.

14. The mobile terminal of claim 13, wherein the controller is further configured to:
cause the display to display another web page received from a web server;
extract a plurality of links included in the another web page;
generate another link tree comprising nodes each having path information corresponding to one of the plurality of extracted links included in the another web page;
select another range of nodes, among the nodes included in the another link tree, based on a node corresponding to the displayed another web page;
capture web pages corresponding to the nodes of the selected another range of nodes when an input is received after the another web page has been displayed; and
store, in the memory, images of the captured web pages corresponding to the nodes of the selected another range of nodes.

15. The mobile terminal of claim 13, wherein the controller is further configured to:
when the node corresponding to the displayed web page is a terminal node, select a range of the upper level nodes and a root node based on the terminal node; and
capture upper level web pages corresponding to the selected range of upper level nodes.

16. The mobile terminal of claim 13, wherein the controller is further configured to:
when the node corresponding to the displayed web page is an intermediate node, select a range of upper level nodes and sub level nodes based on the intermediate node; and
capture upper level web pages and sub level web pages respectively corresponding to the selected range of the upper level nodes and the sub level nodes.

17. The mobile terminal of claim 13, wherein the controller is further configured to:
when the node corresponding to the displayed web page is a root node, select a range of sub level nodes based on the root node; and
capture sub level web pages respectively corresponding to the selected range of the sub level nodes.

18. The mobile terminal of claim 13, wherein the captured web pages are restricted to web pages which have been displayed on the display.

19. The mobile terminal of claim 13, wherein the controller is further configured to:
control a total number of the nodes included in the link tree by controlling at least one of the number of nodes which belong to a same level in the link tree and a depth of the link tree.

20. The mobile terminal of claim 13, wherein the controller is further configured to:
capture the displayed web pages when a second input is received.

21. The mobile terminal of claim 13, wherein the controller is further configured to:
cause the display to display the link tree; and
select web pages to be captured based on a touch input applied to the displayed link tree.

22. The mobile terminal of claim 21, wherein a node corresponding to one of the displayed web pages, and nodes corresponding to the selected web pages in the displayed link tree, are images that are visually distinguished from each other.

23. A control method of a mobile terminal having a display, the method comprising:
displaying, on the display, web pages received from a web server;
capturing each of the web pages after the displaying of the web pages;
storing, in a memory, a plurality of images of the captured web pages, wherein the plurality of captured images is stored as a single group;
displaying, on the display, a folder image on an execution screen of a gallery application;
displaying a folder image on an execution screen of a gallery application;
enlarging the folder image to have a predetermined size when a touch input is applied to the folder image, wherein the enlarged folder image displays a thumbnail of each of the plurality of captured images,
wherein the enlarged folder image is displayed to further include a thumbnail corresponding to a first viewing mode, at an upper region, and to include thumbnails corresponding to a second viewing mode, at a lower region,
wherein the first viewing mode is a mode to display captured web pages as web pages on a web application, and the second viewing mode is a mode to display captured web pages in storage order;
displaying, on the display, a first image of the images of the captured web pages, upon selection of one among the stored plurality of images on the execution screen of the gallery application;
displaying, on the display, a shortcut button on a lower end of the displayed first image overlapping a portion of the captured web page of the first image; and
executing a specific application on the mobile terminal to access and display a web site that is associated with the captured web page of the first image in response to an input received with regard to the shortcut button, wherein the application causes access to the web site,
receiving update information and displaying on the display the update information on the images of the captured web pages, if content is updated on the web site corresponding to the captured web pages, and
wherein neither the images of the captured web pages nor thumbnail preview images are updated when the update information is displayed, and when a plurality of web pages is recaptured, only images of newly-captured web pages of the recaptured web pages are added to the stored single group.

* * * * *